C. F. ANDERSON.
MACHINE FOR MAKING FILING FOLDERS.
APPLICATION FILED MAY 17, 1918.
1,325,771.
Patented Dec. 23, 1919.
12 SHEETS—SHEET 1.
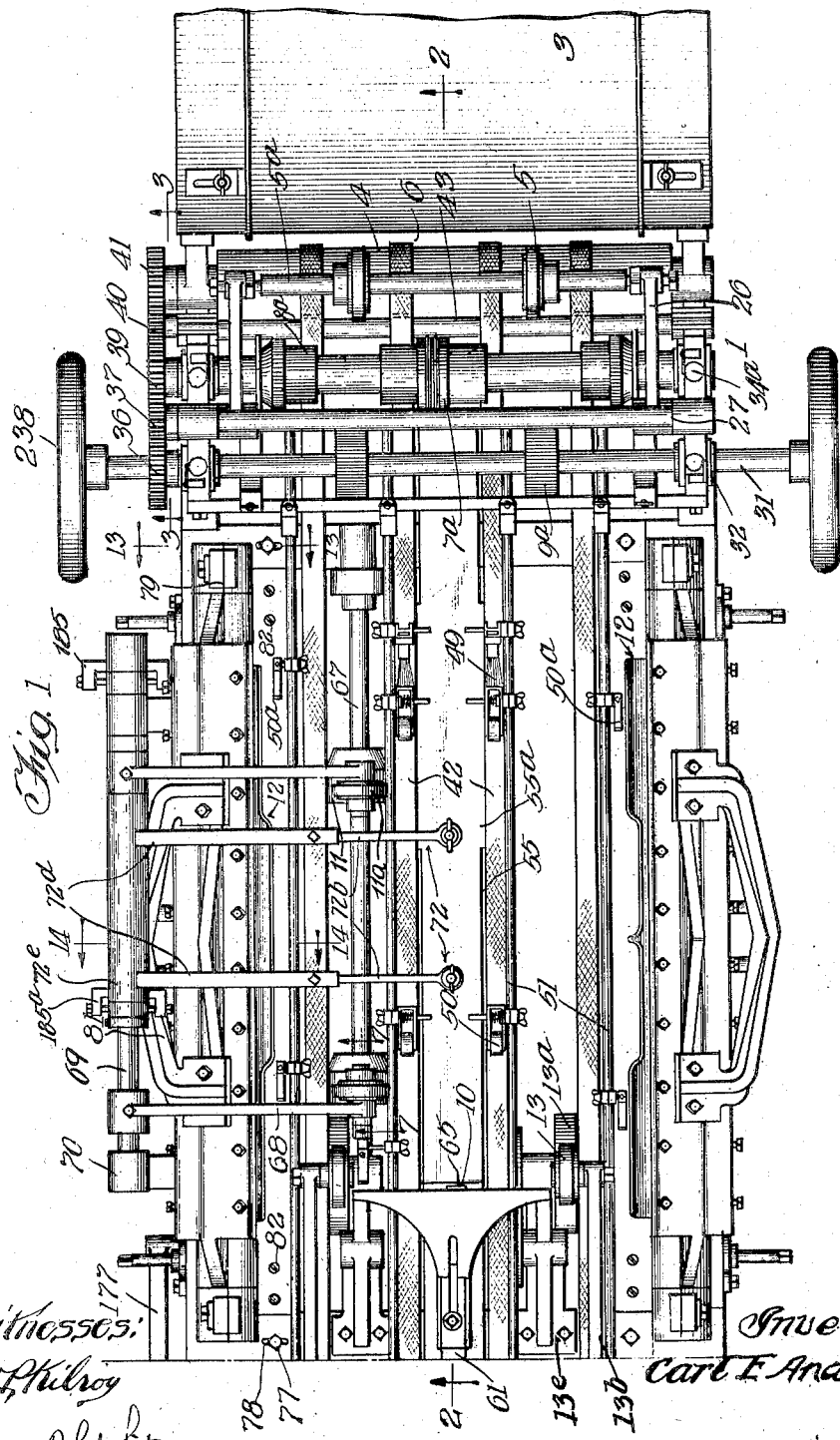
Witnesses:
W. F. Kilroy
Harry R. L. White
Inventor:
Carl F. Anderson
By Miller Chindohl Parker
Attys.

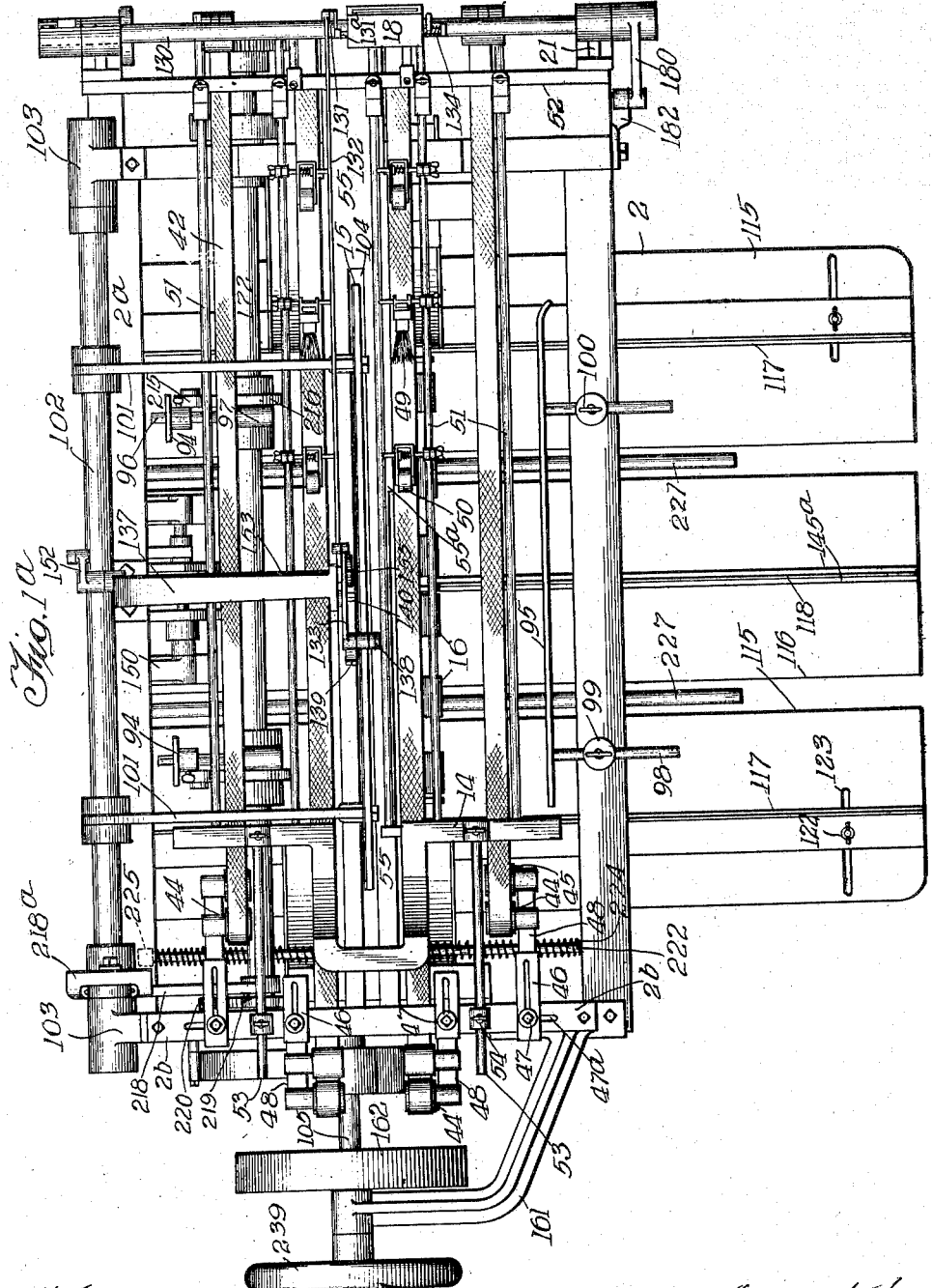

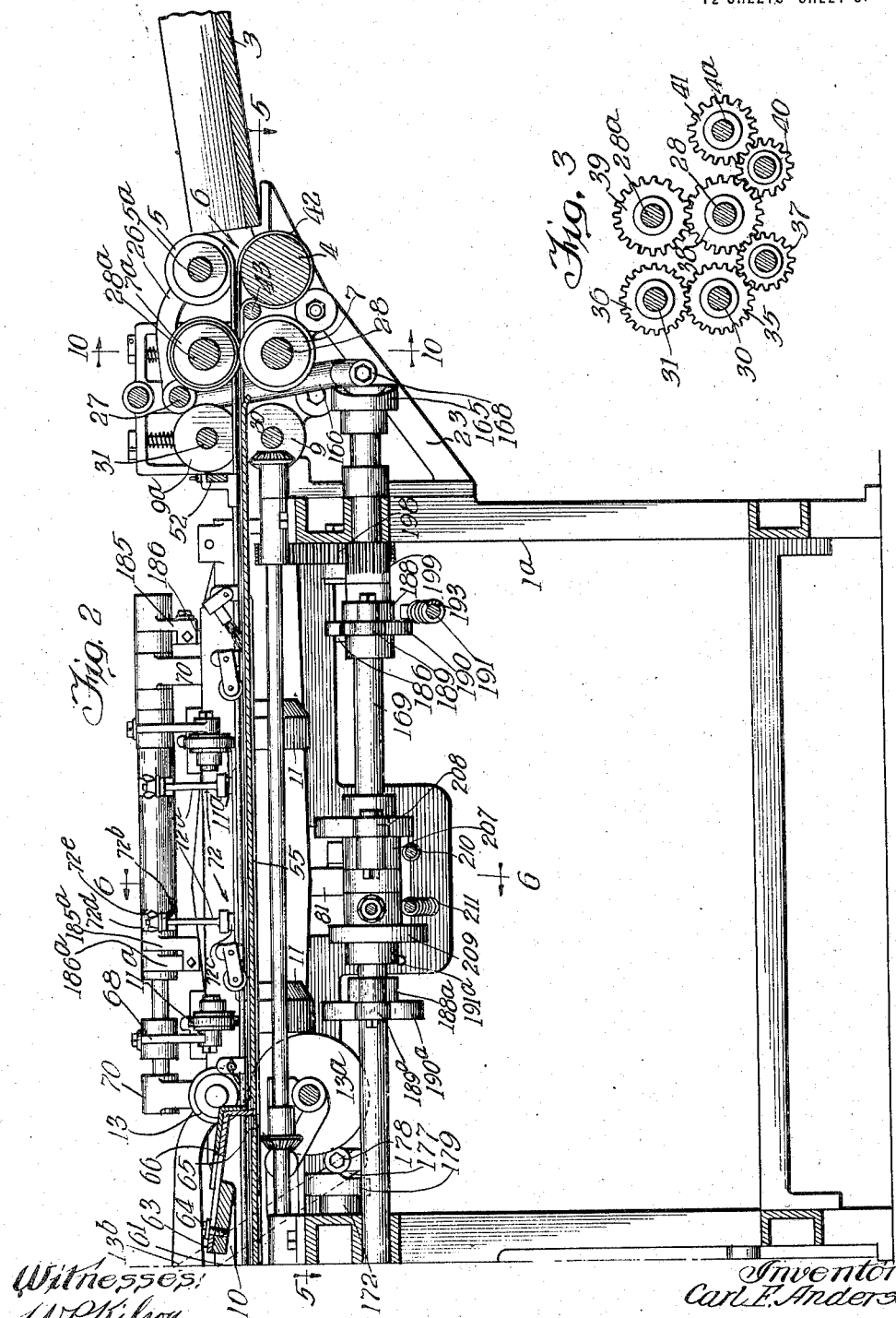

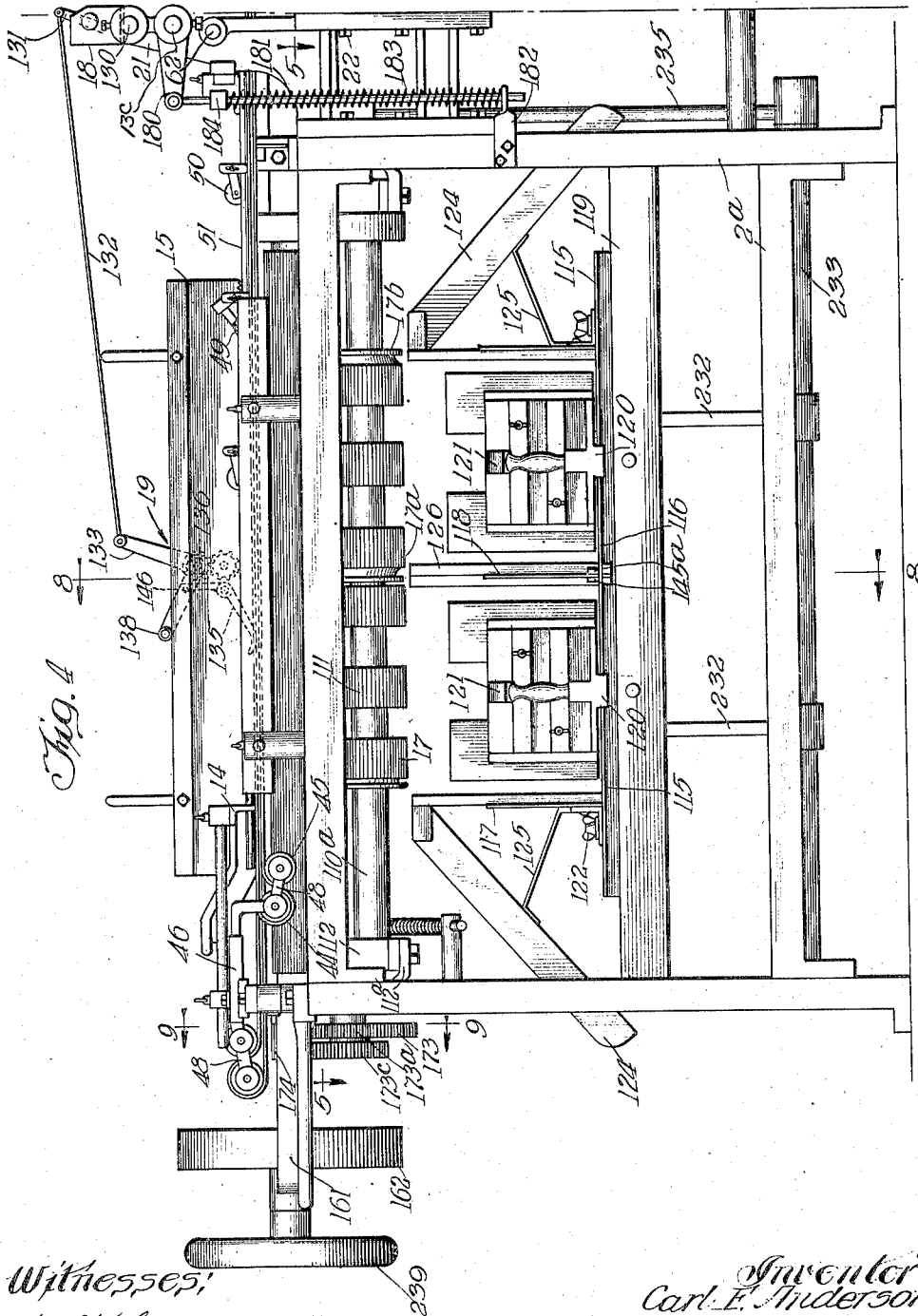

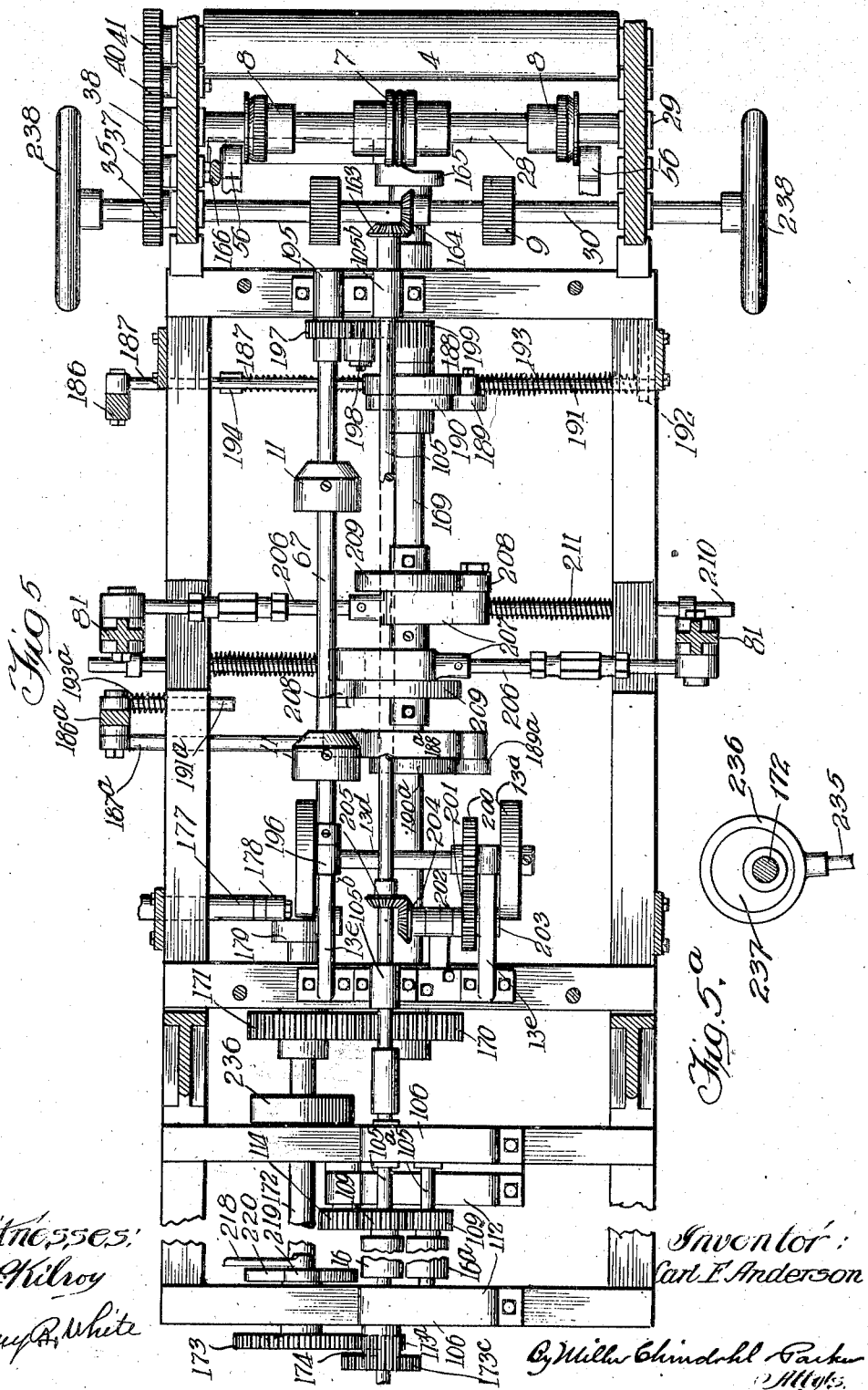

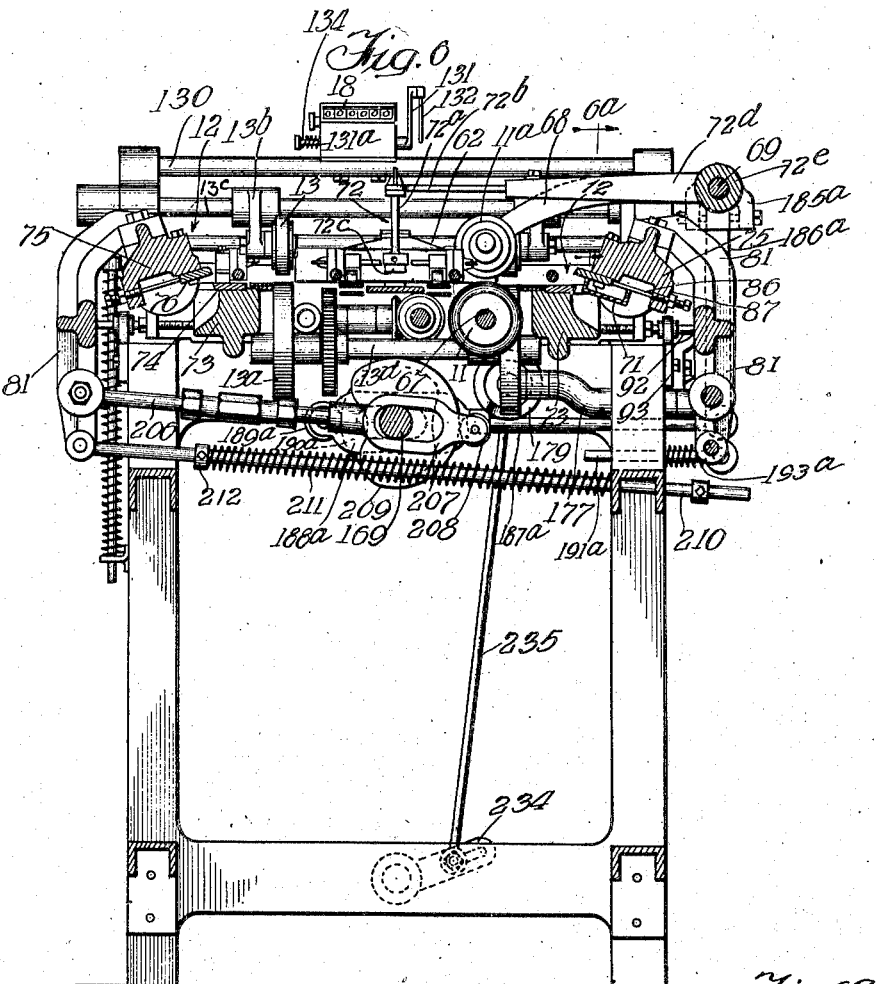

C. F. ANDERSON.
MACHINE FOR MAKING FILING FOLDERS.
APPLICATION FILED MAY 17, 1918.
1,325,771. Patented Dec. 23, 1919.
12 SHEETS—SHEET 7.
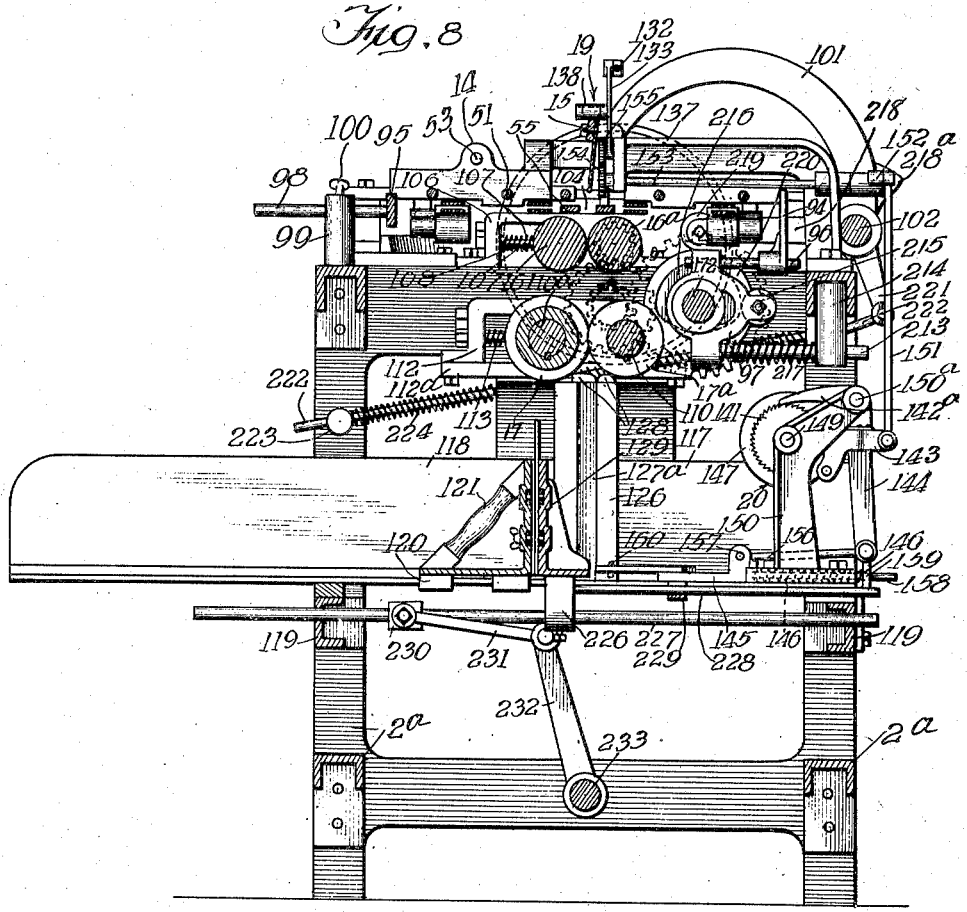
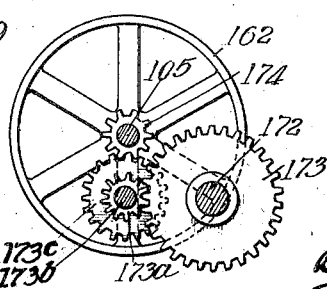

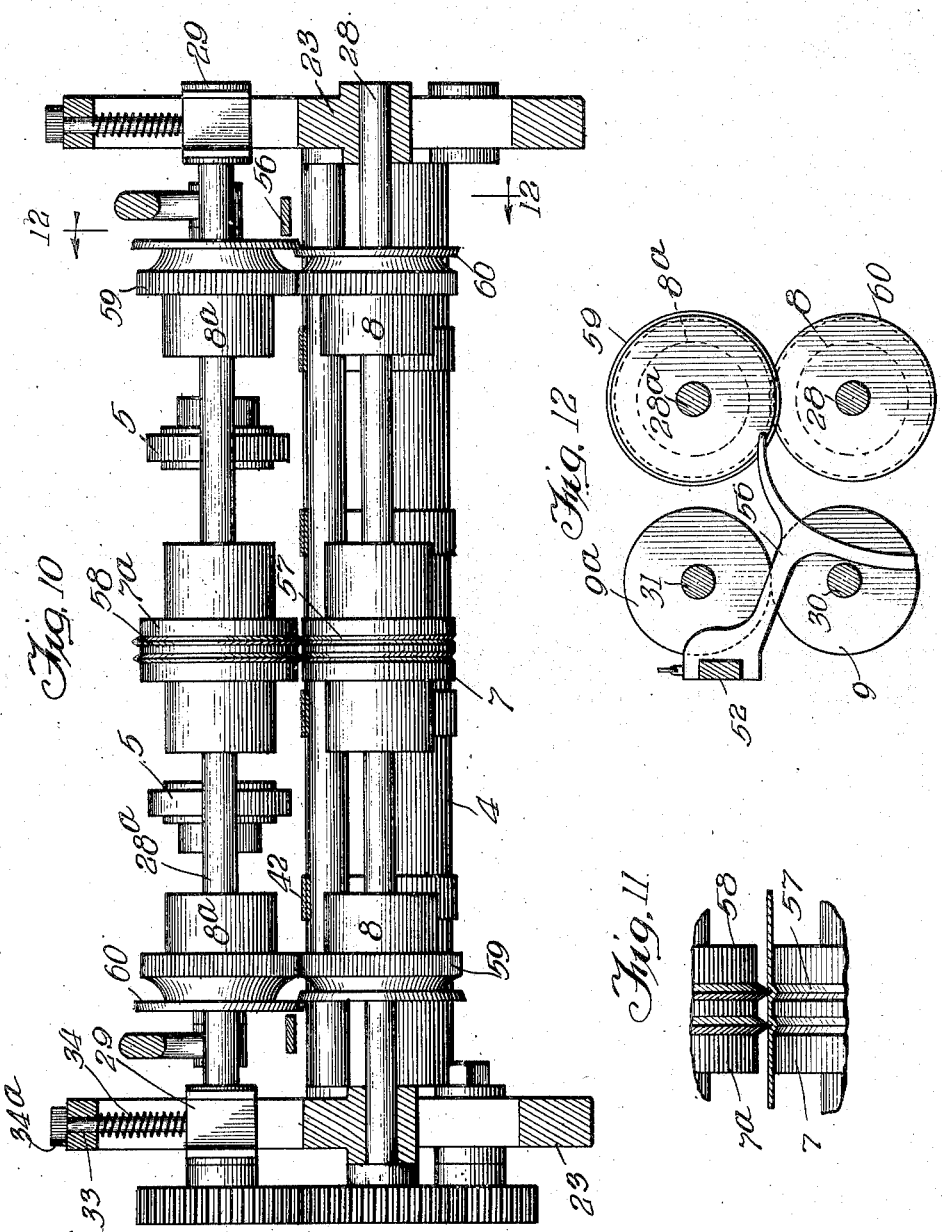

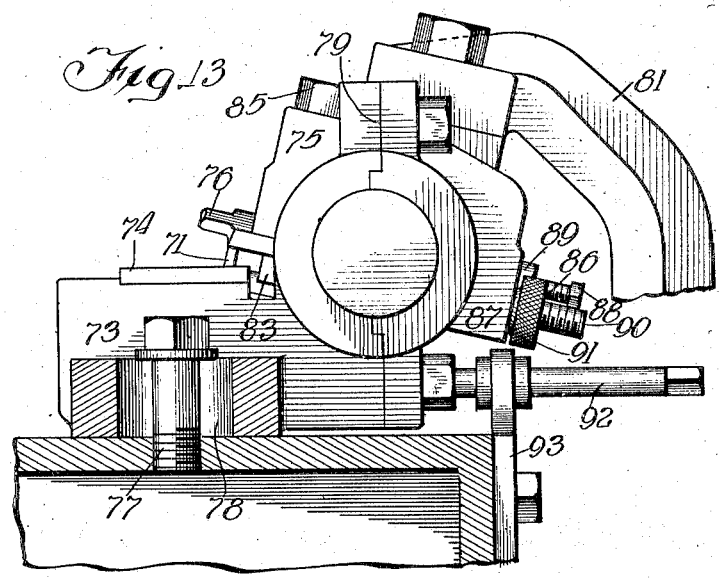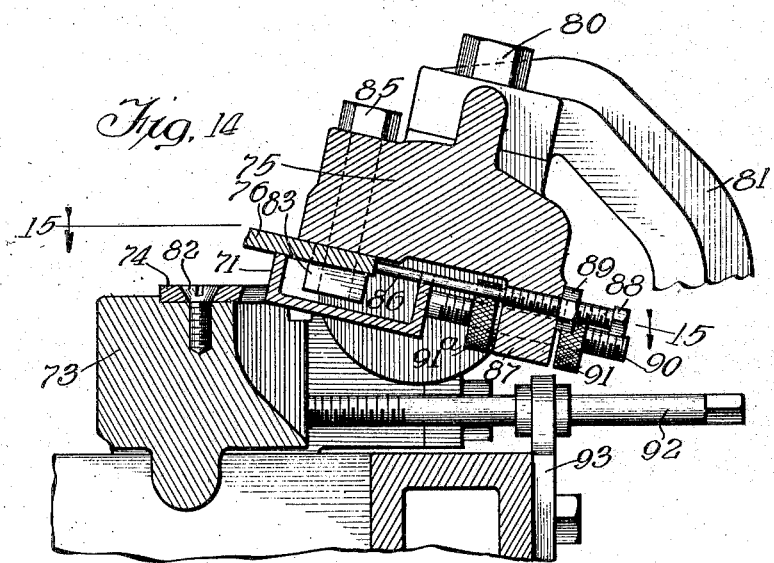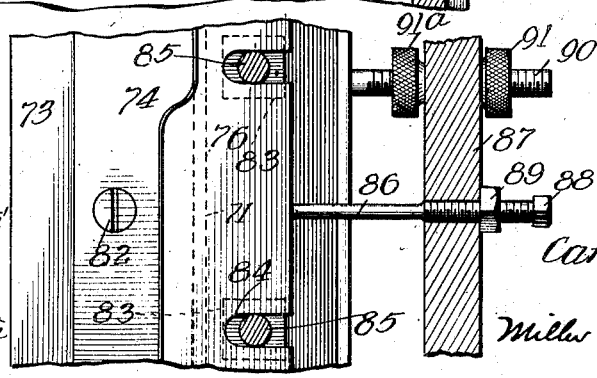

C. F. ANDERSON.
MACHINE FOR MAKING FILING FOLDERS.
APPLICATION FILED MAY 17, 1918.

1,325,771.

Patented Dec. 23, 1919.
12 SHEETS—SHEET 10.

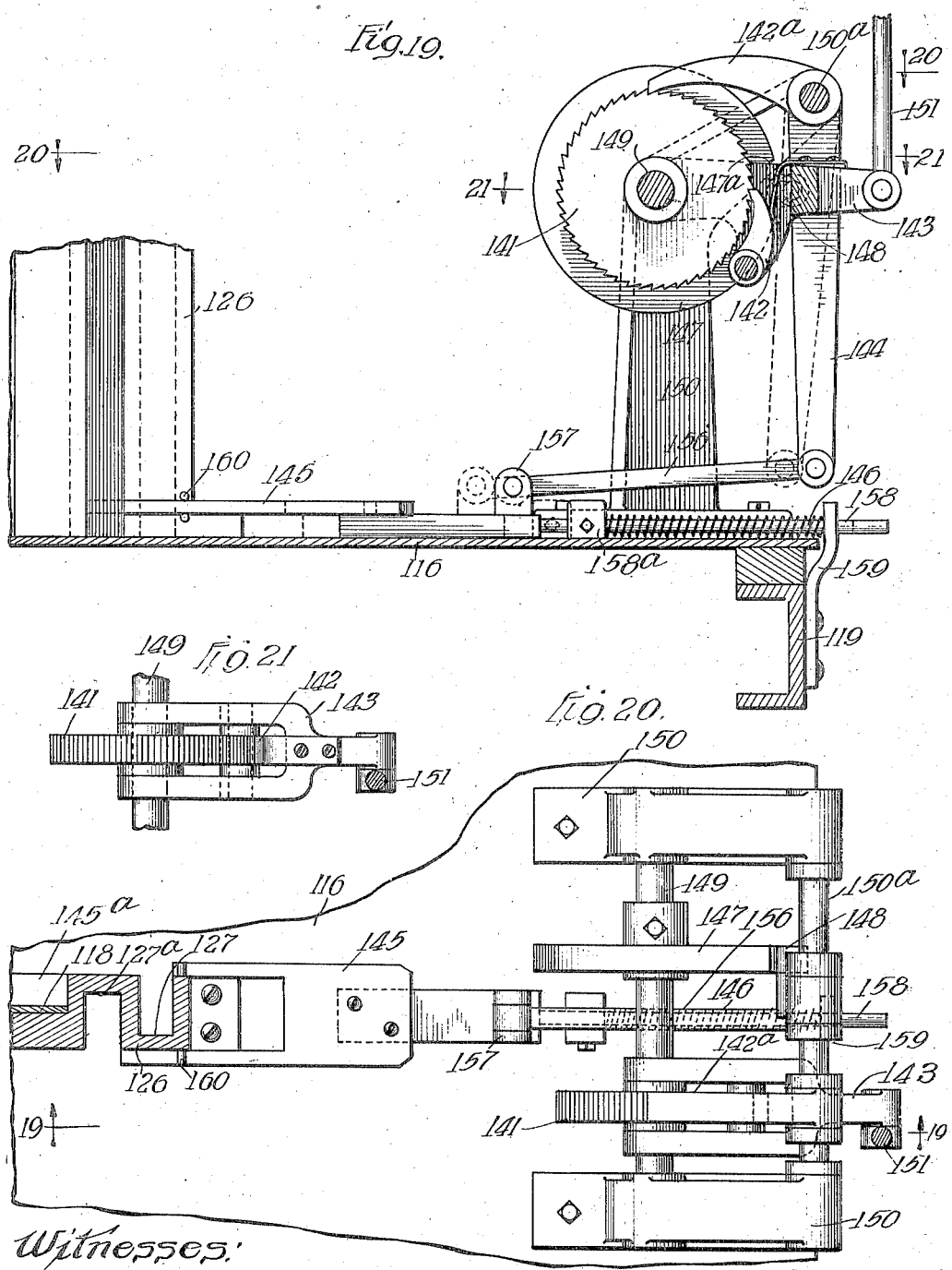

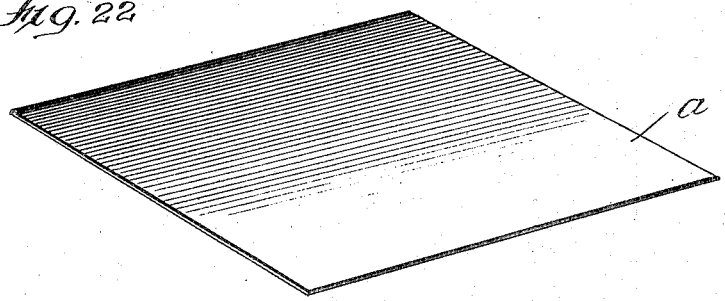
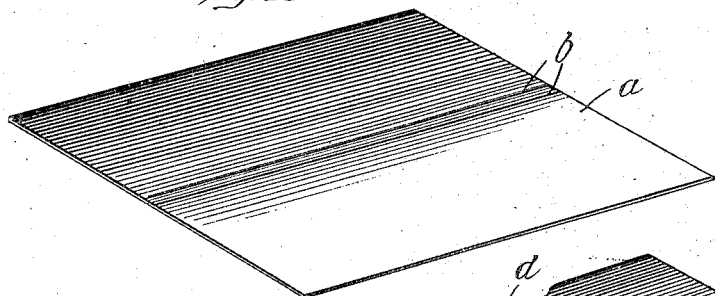
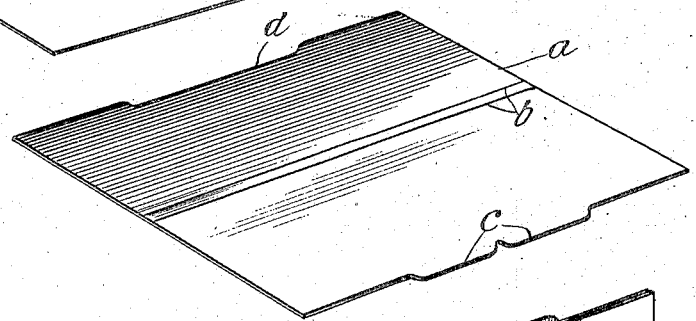
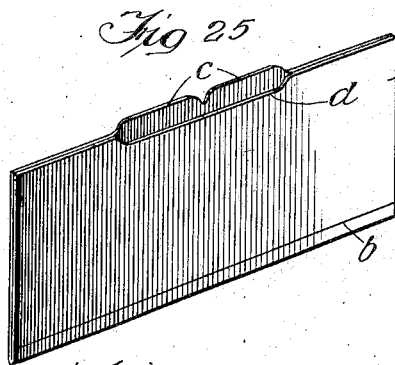
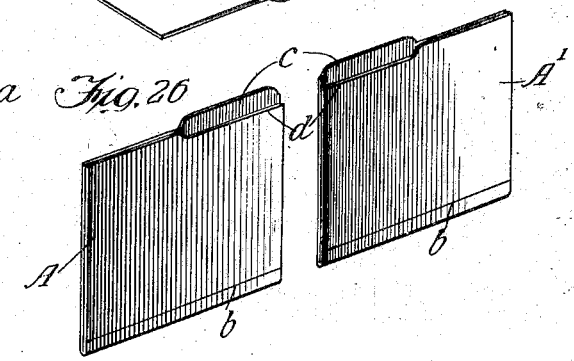

UNITED STATES PATENT OFFICE.

CARL F. ANDERSON, OF CHICAGO, ILLINOIS.

MACHINE FOR MAKING FILING-FOLDERS.

1,325,771.   Specification of Letters Patent.   Patented Dec. 23, 1919.

Application filed May 17, 1918. Serial No. 235,120.

*To all whom it may concern:*

Be it known that I, CARL F. ANDERSON, a citizen of the United States, residing at Chicago, in the county of Cook and State of Illinois, have invented certain new and useful Improvements in Machines for Making Filing-Folders, of which the following is a specification.

The invention relates to a machine for producing vertical filing folders; and the general object of the invention is to produce a machine, of the character stated, of advantageous construction and arrangement which is automatic in operation.

More particularly, an important object of my invention is to produce an automatic folder-making machine of such simplified construction that it may be constructed and operated at a relatively small cost.

A further object of the invention is to provide improved means for forming the name or index tabs of the folders.

A still further object of the invention is to provide means for handling the paper sheets in their passage through the machine.

Another object of the invention is to provide sensitively-actuated mechanism for controlling the operation of a counting device or register.

Another object of the invention is to provide means for dividing the completed folders into sets of a predetermined number and thereby obviate the necessity of counting the folders.

Figure 16:
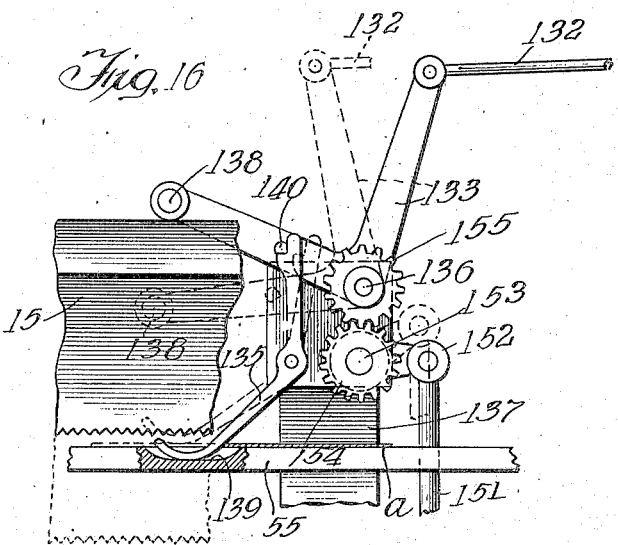
Figure 17:
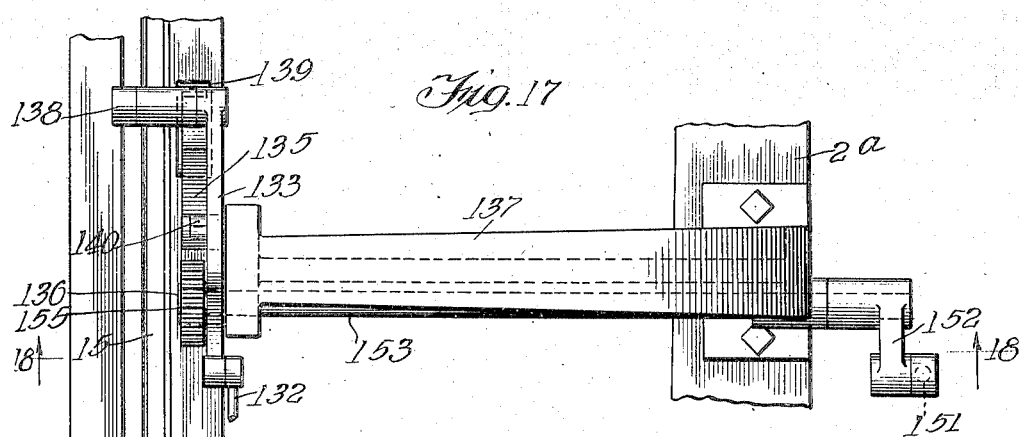
Figure 18:
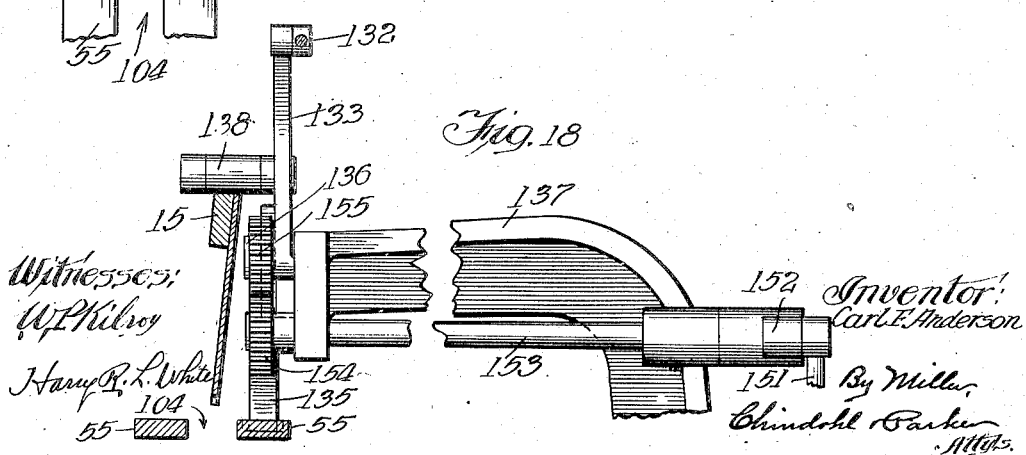

The objects of the invention thus generally stated, together with other and ancillary advantages are attained by the construction and arrangement illustrated in the accompanying drawings forming part hereof, in which Figures 1 and 1ª, taken together, illustrate a top plan view of a preferred embodiment of my invention. Fig. 2 is a vertical sectional view of the forward section of the machine taken on line 2—2 of Fig. 1. Fig. 3 is a sectional view taken on line 3—3 of Fig. 1. Fig. 4 is a side elevation of the rear section of the machine. Fig. 5 is a fragmentary horizontal sectional view taken in the plane of line 5—5 of Figs. 2 and 4. Fig. 5ª is a fragmental detail view of a portion of the operating mechanism. Fig. 6 is a transverse section taken on line 6—6 of Fig. 2. Fig. 6ª is a fragmentary sectional view taken in the plane of line 6ª of Fig. 6. Fig. 7 is a sectional detail view showing the manner of mounting one of the rollers for causing the sheets to move laterally into position for the tab-forming operation. Fig. 8 is a transverse sectional view taken on line 8—8 of Fig. 4. Fig. 9 is a sectional view taken on line 9—9 of Fig. 4. Fig. 10 is a sectional view taken in the plane of line 10—10 of Fig. 2. Fig. 11 is a fragmentary detail view of the scoring rolls in the operation of scoring a sheet. Fig. 12 is a sectional view taken on line 12—12 of Fig. 10. Fig. 13 is an enlarged sectional view taken on line 13—13 of Fig. 1. Fig. 14 is an enlarged sectional view taken on line 14—14 of Fig. 1. Fig. 15 is a sectional view taken on line 15—15 of Fig. 14. Fig. 16 is a fragmentary detail view of the sensitively-actuated controlling mechanism for the counting device. Fig. 17 is a fragmentary top plan view of the same. Fig. 18 is a sectional view taken on line 18—18 of Fig. 17. Fig. 19 is a sectional view taken on line 19—19 of Fig. 20 and illustrating the mechanism for dividing the completed folders into sets of a predetermined number. Fig. 20 is a horizontal sectional view taken on line 20—20 of Fig. 19. Fig. 21 is a vertical sectional view taken on line 21—21 of Fig. 19. Fig. 22 is a perspective view of a blank sheet from which the folder is produced. Fig. 23 is a perspective view of the sheet after it has been scored and trimmed. Fig. 24 is a perspective view of the same after the name tabs have been formed thereon. Fig. 25 is a perspective view of the same after it has been folded. Fig. 26 is a perspective view of the same after it has been severed into two separate folders.

The machine comprises generically a forward section 1 and a rear section 2. The sheets of paper $a$ (Fig. 22), from which the folders are formed, are fed from a chute 3 into the forward section 1 between a roll 4 and a pair of rollers 5. An endless conveyer 6 then carries the sheet between a pair of scoring rolls 7 and 7ª and two sets of side trimming rolls 8 and 8ª, from which it passes, in the form shown in Fig. 23, between a second pair of feed rolls 9 and 9ª, said scoring rolls forming a pair of scores $b$ in the sheet. The feed rolls 9 and 9ª serve to urge the sheet rearwardly and it is carried by the conveyer 6 into engagement with a stop 10 at the rear end of the section 1. Thereupon it is moved laterally by feed rolls 11 and 11ª into position to be acted upon at its opposite side edges by a pair of cutting devices 12 to form index or name tabs c and tab-exposing notches d (Figs. 24 and 26). After the operation of said cutting devices, the rollers 11ª are raised and the stop 10 is swung into inoperative position, and a pair of rollers 13 are swung downwardly upon a pair of rotating rollers 13ª which send the sheet upon the conveyer 6 into the rear section 2 of the machine until it abuts against a stop 14. The sheet is then properly positioned, and is acted upon by a knife 15 (Fig. 8) to fold the sheet upon itself, and force it downwardly between a pair of rolls 16 and 16ª. The folded sheet (Fig. 25) thereupon passes between a plurality of sets of cutting rolls 17, 17ª and 17ᵇ which sever the folded sheet and trim the opposite end edges thereof and form two completed folders A, A', as shown in Fig. 26. The counting device or register 18 is operatively associated, through sensitively-actuated controlling mechanism 19, with the folding knife 15, and operatively associated with said controlling mechanism in turn is a device 20 adapted to act upon certain of the completed folders, which emerge from the machine in upright position, to position such selected folders in a manner to divide the pack into sets of a predetermined number, as, for instance, in sets of fifty folders each.

The frame of the machine upon which the operating devices are mounted comprises a forward section 1ª and a rear section 2ª spaced a short distance apart and connected together by means of a pair of intermediate brackets 21 (Fig. 4) which are secured to the adjacent ends of the respective sections as by means of bolts 22. Upon the forward end of the section 1ª is mounted a pair of brackets 23 (Fig. 2) arranged to support one end of the feed chute 3, the opposite end of which may be supported in any preferred manner. Said brackets 23 also carry the feed rolls 4 and 5, scoring and trimming rolls 7 and 7ª and 8 and 8ª and feed rolls 9 and 9ª. The roll 4 (Fig. 5) is cylindrical in form and is supported at its opposite ends by means of journals 4ª (Fig. 3) mounted in the brackets 23, but the rollers 5 are mounted on a shaft 5ª carried in the ends of a pair of arms 26. Said arms in turn are mounted on a transverse shaft 27 and are arranged to be swung intermittently in the operation of the machine to carry their rollers into and out of engagement with the roll 4. By this means the sheet of paper is fed onto the endless conveyer 6 and between the scoring rolls 7 and 7ª and trimming rolls 8 and 8ª. Said rolls 7 and 7ª and 8 and 8ª are carried by transverse shafts 28 and 28ª, the shaft 28 (Fig. 10) being suitably journaled at its opposite ends in the brackets 23 and the shaft 28ª being mounted at its opposite ends in box bearings 29 and carried by the brackets 23. The feed rolls 9 and 9ª, which receive the sheet from the trimming and scoring rolls, are mounted upon shafts 30 and 31, respectively, the shaft 30 being journaled near its opposite ends in the brackets 23 and the shaft 31 being mounted at its opposite ends in box bearings 32. Preferably the box bearings 29 and 32 are mounted for vertical sliding movement in the brackets and are adapted to be vertically adjustable by means of screws 33 slidable in the brackets and threaded into the movable box bearings. Springs 34 yieldingly force said bearings downwardly and suitable devices 34ª are provided for yieldably locking the screws in adjusted position.

The gearing connections between the shafts 4ª, 28, 28ª, 30 and 31 are shown in Fig. 3. The shaft 30 is herein arranged to be driven in the operation of the machine and the remaining shafts are driven from this shaft. To this end the shaft 30 is provided with a pinion 35 which meshes with a pinion 36 on the shaft 31 and with an idler pinion 37 carried by the bracket and which in turn meshes with a pinion 38 carried by the shaft 28. Said pinion 38 in turn meshes with a pinion 39 carried by the shaft 28ª and also with an idler pinion 40 carried by the bracket and meshing with a pinion 41 carried by one of the journals 4ª of the roll 4.

The endless conveyer 6, which carries the sheet through the machine, extends substantially throughout the entire length of the machine and may comprise a plurality of tapes 42 passing around the roll 4 and upon an idler roll 43 at the forward end of the machine, and around rollers 44 and upon idler rollers 45 at the rear end of the machine. The idler roll 43 is suitably journaled at its opposite ends in the brackets 23 while the rollers 44 and idler rollers 45 are mounted upon brackets 46 adjustably mounted at the rear end of the machine. Said brackets may be of any preferred construction, being herein shown in the form of a longitudinally slotted plate secured, by means of bolts 47 to a transverse bar 2ᵇ mounted upon the rear end rail of the frame 2ª, and carrying arms 48 in which are mounted the bearing studs of the rollers 44. The arms 48 are inclined so that the idler rollers 45 may be conveniently mounted in a plane slightly above or below the rollers 44; and the brackets for the outermost tapes are perfectly adapted to be adjusted laterally by mounting the bolts 47 in slots 47ª in the bar 2ᵇ.

In order that the conveyer will effectively carry the sheet through the machine, a series of brushes 49, rollers 50 and fingers 50ª are arranged at intervals throughout the machine and adapted to yieldingly press the sheet upon the traveling tapes 42. Said pressure devices may be adjustably mounted upon longitudinally-extending rods 51 in any suitable manner and said rods are in turn mounted at their rear ends in the stop member 14 (Fig. 1ª) and their forward ends are adjustably mounted in a transverse bar 52 secured to the rear sides of the brackets 23. The rods also serve to guide the sheet $a$ in its travel.

The stop member 14 at the rear end of the machine is carried upon the forward end of a pair of rods 53 adjustable longitudinally in brackets 54 which are mounted on the bar 2ᵇ on the rear end of the frame 2ª, and it will be apparent that the rods 51 may thus be readily adjusted longitudinally of the machine. Preferably, the forward ends of the rods 51 are extended forwardly from the cross bar 52 between the upper and lower rolls carried by the brackets 23. The rods thus serve as guides for the sheet passing between the rolls, and preferably a central plate 55 extends throughout the length of the machine between the two central tapes 42 but just below said tapes. Said plate is suitably mounted on the frame and near its forward and rear ends may be enlarged laterally as at 55ª to form supports for the central tapes and thus enable the brushes 49 and rollers 50 thereover to more effectively function. It will be apparent that the brushes serve to prevent a rebound of the sheet upon striking the stops 10 and 14, and the fingers 50ª guide the sheet so that it will not engage with the cutting devices 12.

In order that the paper which is trimmed from the side edges of the sheet $a$ by the cutting rolls 8 and 8ª will be properly deflected downwardly as the sheet passes rearwardly in the machine from said rolls, I have provided a pair of deflecting members 56 (Fig. 12). Said members are adjustably mounted upon the transverse bar 52 in any suitable manner and at their forward ends have an arcuate portion arranged to lie alongside the cutting wheels.

The scoring rolls 7 and 7ª may be of any preferred construction. Herein (Fig. 10) they are in the form of cylindrical rolls of substantial width and have on their peripheries annular grooves 57 and ribs 58 respectively. Preferably said rolls are adapted to make two scores $b$ in the sheet as it passes therebetween, in order that the folder may be readily bent, when necessary in use, to provide a thickness for the purpose of accommodating any substantial quantity of papers to be filed. It will be understood, however, that in making the folder the sheet is bent along only one of such scores, as shown in Fig. 26. It will also be understood that any desired number of scores may be made in the sheet by the use of the proper number of ribs and grooves.

The cutting rolls 8 and 8ª may also be of any preferred construction, being herein shown as comprising roll portions 59 (Fig. 10) to engage with the sheet, and coöperating flanged portions 60 for cutting the sheet; and the feed rolls 9 and 9ª may be in the form of disks and are preferably mounted in longitudinal planes substantially midway between the scoring rolls 7 and 7ª and the cutting rolls 8 and 8ª.

The sheet $a$ upon leaving the feed rolls 9 is carried forwardly by the conveyer 6 until it engages with the stop 10. Said stop (Figs. 1 and 2) is carried by an arm 61 which is mounted upon a shaft 62 (Fig. 6) and arranged to be intermittently swung in the operation of the machine to move the stop 10 into and out of operative position. Preferably the stop comprises a slotted plate 63 adjustably secured upon the forward end of the arm 61 as by means of a cap screw 64 entered through the slot in the plate and threaded into the arm. To form the stop the forward end of the plate is bent downwardly and its lower end preferably enters a transverse recess 65 formed in the upper surface of the plate 55 between the tapes 42. This construction insures that when the stop is in its operative position, the lower edge thereof will lie below the plane of movement of the sheet, and in order to prevent the rear end of the sheet from riding upwardly upon the forward face of the stop a second plate 66 is preferably secured to the plate 63, the lower edge of said plate 66 forming an abutment arranged to be engaged by the sheet when it tends to slide upwardly upon the stop.

When the sheet $a$ has come to rest before the stop 10 it is moved laterally a short distance into position to be acted upon by the tab-forming devices 12. The means for moving the sheet laterally preferably comprises the rolls 11 and the operating rolls 11ª (Fig. 6). The rolls 11 are mounted upon a longitudinally extending shaft 67 arranged to be continuously rotated in the operation of the machine and said rolls are preferably tapered at their forward ends to remove the possibility that the sheet will be stopped thereby in its rearward movement. The rollers 11ª are mounted on the free ends of a pair of arms 68 carried by a shaft 69, said shaft being supported in brackets 70 suitably secured at one side (to the right, Fig. 6) of the frame 1ª. The arms 68 are arranged to be intermittently swung in the operation of the machine, as hereinafter set forth, to move the rolls 11ª into and out of engagement with the rolls 11, and when a sheet has been moved into position to be engaged by said rollers 11ᵃ, it will be moved laterally thereby. Such lateral movement of the sheet is limited by a stop 71 carried by one of the cutting devices 12, and in order to prevent a buckling of the sheet in case the rollers 11ᵃ should continue to engage with the sheet after the sheet has engaged with the stop, said rollers are yieldingly mounted upon their bearing stud 11ᵇ, as shown in Fig. 7. To this end the openings in the rollers 11ᵃ are made somewhat larger than their bearing studs and the parts are so proportioned and arranged that when the arms 68 are swung to their lowermost position, the weight of the rollers 11ᵃ will be borne by the rolls 11, and thus the rollers are merely held in engagement with the sheet $a$ by gravity.

In order to positively prevent any vibration of the sheet which may occur after the sheet has been carried into engagement with the stop 71, a pair of holding devices 72 are preferably provided (see Figs. 1, 2 and 6), which are arranged to engage with the sheet and firmly hold it in the proper position during the operation of the cutting devices 12. Said devices 72 may each comprise an upright stem 72ᵃ mounted for vertical adjustment on the free end of a horizontal arm 72ᵇ and carrying at its lower end a finger 72ᶜ of rubber or the like. The arm 72ᵇ is adjustably mounted in the free end of an arm 72ᵈ and the opposite end of said arm 72ᵈ is fixed on a sleeve 72ᵉ rotatably mounted on the shaft 69, which is supported at one side of the frame. The arms 72ᵈ of said devices are arranged to be swung by means to be hereinafter described to periodically lower the fingers 72ᶜ into engagement with the sheet, the parts being so proportioned and arranged that the fingers will engage with the sheet and press it upon the central longitudinal plate 55 (Fig. 1) as soon as the sheet has been moved into engagement with the stop 71, and will hold it in such position until after the opposite side edges of the sheet have been operated upon by the cutting devices 12 to form the index tabs $c$ and tab-disclosing notches $d$.

Each of the cutting devices 12 for forming the name tabs $c$ and notches $d$ therefor, on the opposite side edges of the sheet $a$, are mounted at the opposite longitudinal edges of the frame 1ᵃ and each comprises a fixed member 73 (Figs. 6 and 14) having a blade 74 thereon, and a movable member 75 having a blade 76 thereon, arranged to coöperate with the blade 74 to form shears. The fixed member 73 is in the form of an elongated bar, the opposite ends of which are supported by the ends of the frame 1ᵃ and adjustably secured thereto as by means of bolts 77 entered through laterally extending slots 78 and screw-threaded into the top end rails of the frame. At its opposite ends said bar is provided with outwardly extended portions upon which are formed bearings 79 for the opposite ends of the movable member 75. The member 75 is also in the form of an elongated bar and has secured upon its upper surface, as by means of bolts 80, the upper ends of a V-shaped arm 81. Said arm extends downwardly alongside the frame 1ᵃ and is operatively connected to mechanism for intermittently operating the member 75 as hereinafter set forth. The cutting blade 74 of the stationary member 73 is secured upon the upper surface of said member, as by means of screws 82, with its cutting edge projecting slightly beyond the outer longitudinal edge of the member; and the blade 76 on the movable member is adjustably secured on the under surface thereof, with its cutting edge projecting beyond the inner longitudinal edge of the member. To this end, a plurality of bolts 83 are entered through open-ended slots 84 in the blade and through the member 75, the upper ends of the bolts being provided with clamping nuts 85. It will be seen that by loosening the nuts 85, the blade 76 may be moved laterally for adjustment relative to the fixed blade 74, and the means for thus adjusting the blade 76 preferably comprises a plurality of rods 86 having screw-threaded outer ends extending through openings in a depending flange 87 of the movable member 75 and secured at their inner ends to the outer edge of the blade. Suitable heads 88 and lock nuts 89 are provided on the outer ends of the rods.

The stop 71 (Figs. 6 and 14) which limits the lateral movement of the sheet is in the form of a channel bar mounted on the under side of the member 75 at the edge of the machine toward which the sheet is moved. The outer upright wall of the said bar is slidably supported upon the rods 86 and the upper edge of the inner upright wall of said bar engages with the underside of the blade 76 a short distance inward from the cutting edge of the blade. Thus when the member 75 is in raised or inoperative position, said inner upright wall will serve as an abutment for the laterally moving sheet, while the under surface of the blade 76 prevents the sheet from riding upwardly upon the abutting wall of the bar. The stop is arranged to be adjusted laterally relative to the member 75 and to this end a pair of threaded stems 90 are entered through threaded openings in the flange 87 of the member 75 and is provided upon opposite sides of said flange with a pair of knurled nuts 91 and 91ᵃ, the nut 91ᵃ serving as a lock nut.

As shown in Fig. 1, the cutting edges of the blades 74 and 76 are preferably shaped to form the index tabs along one edge of the sheet and to cut away a portion from the opposite edge of the sheet to form the notches $d$ which, when the sheet is folded, lie immediately below the index tabs so as to enable the tabs to be seen more readily when the folders are in use. It will be evident that any form or arrangement of the tabs and notches may be obtained by the use of cutting blades having edges of the desired shape.

It will be apparent that by reason of the mounting of the movable member 75 upon the fixed member 73, the cutting device may be readily adjusted, for different sizes of folders to be made, by loosening the bolts 77 and adjusting the member 73 to the extent permitted by the length of the slots 78. The means for this purpose comprises a pair of rods 92 fixed against longitudinal movement in supporting brackets 93 on the frame and threaded into the outer edge of the member 73. The outer ends of the rods may be squared for engagement by a wrench.

It will also be apparent that by reason of the pivotal mounting of the member 75, the cutting blade 76 coöperates with the blade 74 with a shearing action. This construction not only serves to form a better and cleaner cut, but requires less power to operate the cutting devices.

After the cutting devices 12 have operated upon the sheet, the rolls 11$^a$ are swung out of engagement with the rolls 11, the stop 10 is raised into inoperative position and the rolls 13 are swung downwardly to press the sheet upon the rotating rolls 13$^a$. Said rollers 13 are mounted on the free ends of a pair of arms 13$^b$, which in turn are fixed on a shaft 13$^c$, the opposite ends of which are journaled in the brackets 21. Said shaft is arranged to be rocked intermittently in the operation of the machine to swing the rollers 13 into and out of engagement with the rollers 13$^a$. The latter rollers are mounted on a continuously rotating transverse shaft 13$^d$ (Fig. 5) the opposite ends of which are journaled in the free ends of a pair of arms 13$^e$ mounted on the rear end rail of the frame 1$^a$.

The rollers 13 and 13$^a$ urge the sheet rearwardly upon the conveyer 6 into the rear section of the machine, where it engages with the stop 14. Thereupon a pair of upstanding laterally moving arms 94 at one edge (to the right, Fig. 8) of the frame 2$^a$, engage with the sheet and move it into engagement with a longitudinally extending bar 95 at the opposite edge of the frame 2$^a$. The arms 94 (Fig. 8) are mounted at their lower ends upon the outer ends of a pair of horizontal rods 96. Said rods 96 are fixed in the upper ends of a pair of members 97 (Fig. 8) and are arranged to be reciprocated thereby in the operation of the machine to actuate the arms 94. The bar 95 is mounted on the ends of a pair of rods 98 adjustable in the upper ends of a pair of posts 99 and arranged to be held against movement by means of thumb screws 100. It will be understood that the bar 95 is so set that when the sheet is moved into engagement therewith by the arms 94, it will be properly positioned for engagement along one of its scores $b$ by the folding knife 15, and preferably the sheet is so positioned that the knife will engage with the score which is nearest the upper edge of the back of the folder, as shown in Fig. 25 so that as the file expands in use, the upper edge of the front of the folder will be lowered rather than the upper edge of the back, which would hide the index tab from view.

The stop 14 (Fig. 1$^a$), as above set forth, is mounted at the rear end of the frame 2$^a$ upon the rods 53 and is adjustable longitudinally of the frame. The position of the sheet longitudinally of the frame is thus readily determined as soon as the sheet reaches the limit of its rearward movement, and after it is positioned laterally of the frame by the arms 94 and bar 95 the knife 15 is actuated to force the sheet folded upon itself between the rollers 16 and 16$^a$. In order that the knife may operate freely throughout the entire length of the sheet without interference by the stop 14, said stop is preferably bent rearwardly at its center.

The knife 15 is suitably mounted upon the free ends of a pair of arms 101 which in turn are fixed upon a longitudinally extending shaft 102. The opposite ends of said shaft are journaled in brackets 103 mounted at opposite ends of the frame 2$^a$ near one edge thereof. Said shaft 102 is arranged to be actuated in the operation of the machine intermittently to swing the knife 15 downwardly through a slot 104 in the central plate 55 whereby to insert the sheet doubled upon itself between the rolls 16 and 16$^a$.

The rolls 16 and 16$^a$ extend longitudinally of the machine and are mounted upon shafts 105 and 105$^a$ (Fig. 5). The shaft 105 is journaled in brackets 106 mounted upon the upper sides of the forward and rear end rails of the frame 2$^a$, while the shaft 105$^a$ is journaled at its opposite ends in box bearings (not shown) mounted for lateral movement in the brackets 106. Springs 107 (Fig. 8) carried on stems 108 on the bearings, serve to yieldingly hold the roll 16 in engagement with the roll 16$^a$.

From the rolls 16 and 16$^a$ the folded sheet passes downwardly between the cutting rolls 17, 17$^a$ and 17$^b$ which are mounted upon longitudinal shafts 110 and 110$^a$ (Figs. 4 and 8). The sets of rolls 17, 17$^a$ and 17$^b$ are preferably made like the rolls 8 and 8$^a$ with the disk portions for feeding the sheet and with the flanged portions for cutting the sheet. In addition to such trimming and severing rolls, two sets of feed rolls 111 are also preferably mounted upon the shafts 110 and 110ª. The shaft 110 is journaled at its opposite ends in brackets 112, which are similar to the brackets 106, and are mounted upon plates 112ª secured to the undersides of the forward and rear end rails of the frame 2ª. The shaft 110ª like the shaft 105ª is mounted in box bearings (not shown) laterally slidable in said brackets 112 and forced by springs 113 to yieldingly hold the rolls upon the shaft 110a in engagement with the rolls upon the shaft 110.

Each of the shafts 105 and 105ª and 110 and 110ª has a pinion 109 thereon (Fig. 5), the pinions on the shafts 105 and 105ª meshing with each other and the pinions on the shafts 110 and 110ª meshing with each other. An idler pinion 114 suitably mounted on the bracket 106 and meshing with the pinions 109 on the shafts 105 and 110 causes the shafts 105 and 105ª and 110 and 110ª to operate together. The pinions 109 on the shafts 110 and 110ª are not shown herein.

It will be seen that as the forced sheet a passes downwardly between the rolls 17, 17ª and 17ᵇ the opposite ends thereof will be trimmed by the rolls 17 and 17ᵇ and at its center it will be severed by the roll 17ª into two complete folders, A and A' as shown in Fig. 26, which drop into receiving chutes, formed by laterally extending bottom plates 115 and 116 and upright side plates 117 and 118. The bottom plates 115 and 116 are suitably mounted upon longitudinal supporting rails 119 at each side of the machine and are spaced apart sufficiently to receive between them the guiding lugs 120 of a pair of headers 121 which may be of any preferred construction. The plates 117, forming the outer walls of each chute are preferably adjustably secured to the bottom plates 115 as by means of thumb screws 122 entered through L-flanges at the bottom edges of said side plates and elongated slots 123 in the plates 115. The plates 118, forming the inner walls of the chutes, may be permanently secured to the bottom plates 116 in any suitable manner. If desired, a pair of chutes 124 (Fig. 4) may be mounted upon the side plates 117 as by means of brackets 125, to carry off the paper trimmed from the ends of the sheet. The means for guiding the folders, as they emerge from the cutting and feeding rolls on the shafts 110 and 110ª comprises an upright member 126 (Figs. 8, 19 and 20) secured to the rear end of the upright plate 118 which terminates centrally of the machine. The opposite sides of said member are provided with upright grooves 127 and 127ª which may, for convenience in construction, be formed out of alinement with each other. One of the grooves, herein groove 127ª, is positioned so as to receive the folders directly from the feeding and cutting rolls, while the other one of said grooves is located a short distance rearwardly and the folders are deflected thereinto by means of inclined guide plates 128 (Fig. 8) mounted at the upper end of said member 126. The grooves 127 and 127ª serve to maintain the folders in upright position until forced laterally outwardly by reciprocating followers 129 into engagement with the headers 121 or the preceding folders. The last folders are then held in upright position between the outer edge of the member 126 and the headers or preceding folders.

The register 18, for counting the folders produced, may be of any suitable and well known construction, and is mounted upon a rod 130 carried by the upper end of the brackets 21 between the forward and rear end sections 1ª and 2ª. Said register has an operating lever 131 (Figs. 4 and 6) mounted on an operating shaft 131ª and operatively connected to the sensitively actuated controlling means 19 by means of a link 132.

The controlling means 19 (Fig. 16) comprises a pivotally mounted bellcrank lever 133 operatively associated with the folding knife 15, an actuating spring 134 mounted on the operating shaft 131ª of the register 18 and a pivoted finger 135 normally preventing the operation of said lever. The bellcrank lever 131 is pivoted upon a stud 136 on the inner end of an arm 137 (Fig. 8) which is secured upon the side rail at one edge of the frame 2ª. One arm of said lever is pivotally connected with the link 132 which is connected to the operating lever 131 of the register and the other arm of said lever has a laterally extending roller 138 overlying the upper edge of the folding knife 15. The spring 134 tends to rotate the shaft 131ª in a direction to force the roller 138 into engagement with the upper edge of the folding knife 15 and to follow the same in its movements, but such movement of the lever is controlled by the finger 135 which is pivoted between its ends on the end of the arm 137. Said finger has a bent lower end which normally rests in a recess 139 (Fig. 16) in the upper surface of the plate 55 and over which the sheet a is arranged to pass. The upper end of the lever is notched and when the bent end of the finger lies in the recess 139, is arranged to engage with a stud 140 carried by the bellcrank lever 133, to prevent an actuation of said lever by the spring 134 when the knife 15 is swung downwardly. It will be evident that in the absence of a sheet a to be operated upon by the knife 15, the finger 135 will rest in the recess 139 and thus prevent the operation of the lever 133 to actuate the register 18; but that when a sheet is carried into position to be folded, as shown in dotted lines in Fig. 16, it will raise the finger against the action of gravity and thus permit the lever to be swung by the spring 134 when the knife 15 is operated to actuate the register.

The means 20 for dividing the completed folders into sets of a predetermined number is also operatively associated with the controlling mechanism 19. Said dividing means preferably comprises a toothed wheel 141 (Fig. 19), having an actuating pawl 142 and a holding pawl 142ª, and a lever 143 operatively connected to the controlling mechanism 19 for operation by the bellcrank lever 133. A pivoted arm 144 is operatively connected to a slide 145 and said slide is arranged to be moved in one direction by a spring 146. The movement of said slide by the spring is normally prevented by a disk 147 rotatable with said toothed wheel and engaged on its periphery by a roller 148, carried by the arm 144, but said disk has a recess 147ª in its periphery which, when engaged by the roller 148, permits a movement of the arm 144 and thereby of the slide 145 by the spring 146.

The toothed wheel 141 and disk 147 are fixed upon a shaft 149, the opposite ends of which are journaled in a pair of upright brackets 150, mounted upon the bottom plate 116 of the folder-receiving chutes, and the lever 143 is bifurcated to receive the toothed wheel 141, and is pivoted on said shaft 149 and carries the actuating pawl 142. The lever 143 is connected by means of a link 151 with a crank arm 152 (Figs. 8 and 18) mounted on a shaft 153 which is journaled in the arm 137 on the frame. Said shaft has fixed on its inner end a pinion 154 meshing with a pinion 155 which is mounted on the stud 136 of the bellcrank lever 133, said pinion 155 being fixed relative to the lever 133 for operation thereby. The holding pawl 142ª is pivotally mounted on a shaft 150ª, connecting the upper ends of the brackets 150 and is held in engagement with the toothed wheel 141 by gravity, and the parts are so proportioned and arranged that when the bellcrank lever 133 is actuated by the spring 134, the lever 143 is swung to rotate the toothed wheel 141 forwardly the distance of one tooth.

The arm 144 (Fig. 19) is also pivoted at its upper end on the shaft 150ª and its lower end is connected by means of a link 156 with an upstanding ear 157 on the slide 145. The spring 146 for actuating the slide is mounted on a rod 158, one end of which is fixed in the end of the slide and the other end of which is slidable in a bracket 159 secured to one of the rails 119, and the spring bears between the bracket 159 and the collar 158ª adjustably mounted on the rod 158. The spring 146 thus serves to hold the roller 148 against the periphery of the disk 147 so that it will be apparent that when the disk has been rotated, with the toothed wheel 141, until its recess 147ª is in position to receive said roller, it will permit the arm 144 to swing and thus the slide 145 to move outwardly once for each complete revolution of the toothed wheel. The forward end of the slide 145 is bifurcated and is arranged to be guided by a pair of pins 160 on the lower end of the upright folder-guiding member 126, and the bifurcated ends of said slide are so arranged that when the slide is moved outwardly, upon a complete rotation of the toothed wheel, they stop the inner ends of the folders in their downward movement and thus position them so that their upper edges protrude a short distance above the upper edges of the preceding folders which have dropped during that particular rotation of the toothed wheel. When such raised folders are pushed outwardly in their chutes by the followers 129, their raised ends are supported by a square rod 145ª secured in the angle formed by the inner wall 118 of each chute and the bottom wall 115 (Fig. 4). It will be understood that when the folder in its downward movement strikes the slide 145, the lower inner end thereof is shifted inwardly a short distance beyond the inner edges of the preceding folder by reason of the distortion of the folder due to the supporting of one end thereof above the other. Accordingly when the distorted folder is pushed outwardly in its chute by the follower, the inwardly projecting lower end may be supported by the rod 145ª. In order to insure that the folder may be easily distorted when it strikes the slide 145 in its downward movement, the outer walls 117 are adjusted so that the distance between the inner wall of the grooves 127 and 127ª and said outer walls of the chutes is slightly greater than the length of the folder.

By the construction and arrangement set forth, it will be apparent that it becomes unnecessary for the attendant to count the folders since they are accurately divided, by the sensitively-controlled dividing means, into sets of a number corresponding to the number of teeth on the toothed wheel 141. Thus not only is a great saving of time effected by eliminating the necessity of counting folders, but unavoidable mistakes made in counting, by the attendant, are also eliminated.

The means for actuating the various operating devices of the machine are as follows: The shaft 30 (Fig. 5) from which the scoring, trimming and feeding rolls at the forward end of the machine, and the conveyer 6, are driven is geared directly to the shaft 105, which forms the main drive shaft of the machine and extends longitudinally of the machine centrally thereof. Said shaft is mounted in suitable bearings 105ᵇ on the forward frame section 1ᵃ and in the brackets 106 on the rear frame section 2ᵃ. At is rear end, said shaft projects rearwardly from the machine and is journaled in a bracket 161 (Fig. 1ᵃ), mounted on the rear end of the frame 2ᵃ. On said shaft, between said bracket 161 and the frame, is fixed a drive pulley 162, and on its forward end the shaft has fixed a beveled pinion 163 which meshes with a beveled pinion 164 fixed on the transverse shaft 30 which carries the feed rolls 9.

The shaft 27 which carries the arms 26 for supporting the rollers 5 (Fig. 2) is arranged to be rotated to swing said arms by means of a cam 165 operating through a crank arm 166 fixed upon said shaft 27 and having a roller 168 arranged to engage with the cam. Said cam is in the form of a disk having a forward cam face, and is mounted on the forward end of a shaft 169 which extends throughout the length of the forward frame section 1ᵃ centrally thereof and is suitably journaled at its opposite ends in the end rails of the frame 1ᵃ a short distance below the drive shaft 105. The rear end of the shaft 169 has fixed thereon a gear wheel 170 (Fig. 5) which meshes with a gear wheel 171 on a shaft 172 journaled in the opposite end rails of the rear frame section 2ᵃ and in the rear end rail of the forward section 1ᵃ. On its rear end said shaft 172 has fixed a gear wheel 173 which meshes with a pinion 173ᵃ fixed on a stud shaft 173ᵇ journaled in the frame. A pinion 173ᶜ on said shaft meshes with a toothed collar 174 fixed on the main shaft 105. The cam shaft 169 is thus continuously rotated by the main drive shaft 105 through the shaft 172 and its gearing connections, and it will be apparent that a rotation of the cam 165 will swing the arms 126 and thereby raise and lower the rollers 5 into and out of engagement with the roll 4 or the sheet *a* fed from the chute 3.

The stop 10 which detains the sheet *a* in its rearward travel for the tab forming operation, is raised and lowered by a rotation of the shaft 62 upon which the arm 61 carrying the stop is mounted. Said shaft 62 has fixed on one end a pinion 175 (Fig. 6ᵃ) which meshes with the toothed segment on the lower periphery of a wheel 176 mounted on the shaft 13ᶜ. Said shaft is arranged to be rocked by means of a lever 177 (Fig. 2) fixed on one end thereof Figs. 1 and 1ᵃ and having at its lower end a laterally extending roller 178 which engages with a cam 179. Said cam is in the form of a disk having a forward cam face and is fixed on the forward end of the shaft 172, which is geared to the main drive shaft 105 as above set forth. The end of said shaft 13ᶜ opposite the lever 177, has fixed thereon an arm 180 (Figs. 1ᵃ and 4) the free end of which is connected to a rod 181 and vertically slidable in a bracket 182 fixed to the side of the machine frame. A spring 183 bearing between a collar 184 and said bracket serves to hold the roller 178 in engagement with its cam 179.

The rollers 11ᵃ (Fig. 6) which are mounted on the ends of the arms 68 fixed upon the shaft 69, are arranged to be swung into and out of engagement with the rollers 11 by a rocking of said shaft 69, and to this end the shaft has fixed on its forward end a bracket 185 adjustably engaging in a well-known manner with a depending arm 186 (Fig. 2), having a hub on its upper end mounted on the shaft 69. The lower end of the said arm 186 is pivotally connected to a link 187 (Fig. 5). On the inner end of said link is fixed a plate 188 which carries a laterally extending roller 189 arranged to engage with the periphery of a cam 190. Said cam is mounted on the continuously rotating shaft 169 and is arranged to move the link 187 in one direction and thereby the arm 186 and shaft 169. A rod 191 is pivotally connected to one end of the arm 186 below the link 187 and at its opposite end is transversely slidable in a bracket 192 (dotted lines Fig. 5) carried by the frame 1ᵃ. A spring 193 mounted on said rod 191 and bearing between the collar 194 and said bracket, serves to maintain the roller 189 in engagement with the cam 190. The parts are so arranged that the spring 193 acts to swing the arms 68 to lower the rollers 11ᵃ, while the cam 190 acts to raise said arms and rollers The arms 72ᵈ which carry the holding devices 72 for the sheet *a*, are arranged to be swung to move the fingers 72ᶜ into and out of engagement with the sheet, as above set forth, by means of a cam 190ᵃ and a spring 193ᵃ. To this end the sleeve 72ᵉ carries a bracket 185ᵃ adjustably engaging with a depending arm 186ᵃ having a hub on its upper end mounted on the shaft 69. The lower end of said arm 186ᵃ is pivotally connected to a link 187ᵃ (Figs. 5 and 6). On the inner end of said link is fixed a plate 188ᵃ which carries a laterally extending roller 189ᵃ arranged to engage with the periphery of a cam 190ᵃ. Said cam is mounted on the continuously rotating shaft 169 and is arranged to move the link 187ᵃ in one direction and thereby the arm 186ᵃ and, through the bracket 185ᵃ, the arms 72ᵈ. A rod 191ᵃ is pivotally connected to the lower end of the arm 186ᵃ below the link 187ᵃ, and at its opposite end is transversely slidable in the frame 1ᵃ, as shown in Fig. 6. A spring 193ᵃ is mounted on said rod 191ᵃ, and bearing between said frame and said arm 186ᵃ serves to maintain the roller 189ᵃ in engagement with the cam 190ᵃ. The parts are so proportioned and arranged that the spring 193ᵃ acts to swing the arm 186ᵃ to lower the fingers 72ᶜ into engagement with the sheet upon the longitudinal plate 55, while the cam 190ª acts to raise said fingers.

The rollers 13 which coöperate with the rollers 13ª to move said sheet *a* rearwardly in the machine after the tab-forming operation, are arranged to be actuated by the oscillation of the shaft 13ᶜ upon which the arms carrying said rollers 13 are fixed. Said shaft, it will be remembered, is rotated by the cam 179 (Fig. 2) which swings the lever 177 fixed to said shaft, and it will be seen that by reason of the gearing connection of the shaft 13ᶜ with the shaft 62 which is arranged to actuate stop 10, said stop and the rollers 13 move in opposite directions when the shaft 13ᶜ is rocked. Thus when the stop 10 is raised to permit the sheet *a* to pass rearwardly in the machine, the rollers 13 are lowered to press the sheet upon the rotating rollers 13ª.

The shaft 67 (Figs. 2 and 5) which carries the rollers 11 for moving the sheet *a* laterally is journaled at its forward end in a bearing 195 upon the forward end rail of the frame 1ª and the rear end of said shaft is journaled in a bearing 196 formed on the forward end of one of the arms 13ᵉ which also carries one end of the shaft 13ᵈ. At its forward end the shaft 67 has fixed thereon a pinion 197 which meshes with an idler pinion 198 mounted on the forward rail of the machine frame and in turn meshing with a toothed collar 199 on the continuously rotating shaft 169. The shaft 13ᵈ has fixed thereon a gear wheel 200 which meshes with a pinion 201 (Fig. 5) fixed on one end of a suitable stud shaft (not shown), mounted in a bracket 202 on the rear end rail of the machine frame and in a bearing 203 in one of the arms 13ᵉ; and at its end opposite the pinion 201 said stud shaft has a beveled pinion 204 which meshes with a beveled pinion 205 on the main drive shaft 105. The rollers 13ª are thus driven directly from the main drive shaft.

The movable members 75 of the cutting devices 12 are each arranged to be oscillated by means somewhat similar to the means for swinging the arms 68 which carry the rollers 11ª. Said means comprises a rod 206 (Fig. 6) pivoted at one end to the arm 81, near the lower end thereof, and fixed at its other end to a slotted plate 207 through which the shaft 169 is arranged to pass. Said plate carries a roller 208 which is arranged to engage with the periphery of a cam wheel 209 fixed on the shaft 169. A rod 210 pivoted at one end to the lower end of the arm 81 with its other end transversely slidable in said rail at the other side of the frame has a spring 211 thereon bearing between said side rail of the frame and a head 212 fixed on the rod. Said spring serves to maintain the roller 208 in engagement with the cam 209, and when the position of the cam permits, swings the arm 81 to lower the cutting edge of the movable member 75. In order to afford sufficient space within which the rods 206 and 210 may operate, the said rails of the frame 1ª are preferably bent downwardly in the form of a U as shown in Fig. 2.

The members 97 which are arranged to be actuated to reciprocate the upstanding arms 94 which position the sheet for the folding operation, are each mounted at their lower ends upon the inner end of a rod 213 (Fig. 8) slidable at its outer end in a depending post 214 carried by one of the side rails of the frame 2ª. Each of said members 97 is transversely slotted to receive the shaft 172 and also carries a roller 215 which is arranged to engage with the periphery of a cam 216 fixed on said shaft 172. Springs 217 on the rods 213 bearing between the members 97 and the posts 214 serve to hold the rollers 215 in engagement with the periphery of the cams 216. By this construction the continuously rotating shaft 172 acting through the cams 216, and the springs 217, reciprocate the upstanding arms 94 to move the sheets *a* into position against the bar 95 at the opposite side edge of the frame 2ª.

The means for oscillating the shaft 102 to swing the arms 101 and thereby the knife 15 to fold the sheet *a* comprises an arm 218 (Figs. 1ª and 8) mounted at one end on a bracket 218ª fixed on the shaft 102. The other end of said arm has a roller 219 thereon arranged to ride upon the periphery of a cam 220 mounted on the continuously rotating shaft 172. The shaft 102 has fixed thereon an arm 221 to the lower end of which is pivoted a rod 222 having its other end slidable in a post 223 mounted on the frame 2ª at the opposite side thereof. A spring 224 acting between said post 223 and a collar 225 (dotted lines in Fig. 1ª) tends to oscillate the shaft 102 in a direction to hold the roller 219 upon the cam 220. By the construction thus set forth it will be seen that the knife 15 is raised and lowered by the continuously rotating shaft 172, and the spring 224.

The followers 129 which force the completed folders outwardly in their chutes, are each provided with a depending supporting bracket 226 (Fig. 8) mounted on a rod 227 transversely slidable at its opposite ends in the longitudinal rails 119 of the machine frame. Said supporting bracket has also fixed thereto one end of a rod 228 which is slidable in a cross bar 229 carried by the bottom plate 115 and 116. Upon the rod 227 is adjustably mounted a head 230 which is pivotally connected by a link 231 with an arm 232 fixed on a shaft 233. Said shaft 233 is suitably journaled in the machine frame and is arranged to be oscillated to reciprocate the follower 129 by means of an arm 234 (Figs. 4 and 6) and a link 235 adjustably connected to said arm and to a member 236 (Fig. 5ª) arranged to be reciprocated by a cam 237 on the continuously rotating shaft 172.

Preferably the shaft 31, which carries feed rolls 9ª and is geared to the shaft 30 operatively connected to the main drive shaft, is extended at each end, as shown in Fig. 1 and is provided with hand wheels 238 on said extended ends. By the use of these hand wheels the machine may be operated manually to bring the parts into any desired position. Similarly the main drive shaft 105 is extended rearwardly and provided with a hand wheel 239 for a like purpose.

The operation of the machine is as follows:

The sheet $a$ from which the folder is to be made is fed from the chute 3 into position upon the feed roller 4. Thereupon the rollers 5 are swung downwardly through the operation of the cam 165 on the shaft 169 (Fig. 2), into engagement with the sheet, and urge it rearwardly upon the conveyer 6 between the scoring rolls 7 and 7ª and the trimming rollers 8 and 8ª, said conveyer and the rolls for operating upon the sheet being geared to the main driving shaft 105 for operation thereby.

In its rearward travel the sheet $a$ is brought to rest by the stop 10 which has been lowered into operative position by the crank arm 177 actuated by the cam 179, said crank arm being fixed on the shaft 62 which is geared to the shaft 13ᶜ carrying the stop arm 61.

When thus brought to rest by the stop 10 the sheet $a$ is pressed by the rollers 11ª on the arms 68 into engagement with the rolls 11 upon the continuously rotating shaft 67, and thus the sheet is moved laterally into position for the tab-forming operation. The swinging movement of the rolls 11ª is accomplished by means of the cam 190, near the forward end of the shaft 169 (Fig. 2), and the spring 193 upon the rod 191. Said spring serves to swing the arms 68 downwardly when permitted by the cam 190 and said cam operates positively to swing the arms 68 upwardly.

When pressed into engagement with the rollers 11 the sheet $a$ is caused to travel laterally until it engages with the stop 71 upon one of the cutting devices 12. In this position of the sheet, it is acted upon by the finger 72ᶜ of the holding device 72 and is held thereby against vibration, the movement of the device 72 being accomplished by means of the cam 190ª which operates through the arm 186ª and arm 72ᵈ, and also by the spring 193ª which operates through said arms to lower said finger into engagement with the sheet upon the longitudinal plate 55.

The sheet $a$ being thus firmly held in position, the cutting devices 12 are actuated to form the name tab $c$ and notches $d$. In this operation the movable members 75 of the cuting devices are rotated to swing their blades 76 downwardly, by means of the springs 211 which operate upon the rod 210 (Fig. 6) when permitted by the cams 209; and in the continued rotation of the cams the rods 206 are actuated to swing the movable member 75 into inoperative position. If desired, the cutting device for forming the notches $d$ for disclosing the index tabs to view, may be disconnected from its operating means, so that such notches will not be formed.

After the tabs and notches have been formed by the devices 12 the stop 10 (Fig. 2) is raised through the operation of the cam 179 on the shaft 172. Simultaneously with the raising of the stop 10 the rollers 13 are permitted by the cam 179 to descend and press the sheet $a$ into engagement with the rollers 13ª, it being remembered that the shaft 13ᶜ upon which the arms 13ᵇ carrying said rollers are mounted, is geared to the shaft 62 (Fig. 6ª).

The sheet $a$ is urged rearwardly by the rollers 13 and 13ª, into the rear section of the machine until it engages with the stop 14. Thereupon the upstanding arms 94 (Fig. 8) are actuated by the springs 217, when permitted by the cam 216 on the continuously rotating shaft 172, to engage with one edge of the sheet and move it laterally until its opposite edge abuts against the bar 95. The arms 94 are returned to their initial position by the cam 216.

When thus positioned by the arms 94 and bar 95, the sheet $a$ is properly located beneath the folding knife 15 so as to be engaged thereby along one of its scores $b$. The knife is then actuated, when permitted by the cam 220, by the spring 224 (Fig. 8) operating upon the rod 222, to swing the shaft 102, through the arm 221, and in such downward movement of the knife the sheet $a$ is forced through the slot 104 in the plate 55 and bent upon itself into the form shown in Fig. 25. The upward movement of the knife is effected by the cam 220 operating through the roller 219 on the arm 218, which latter is fixed upon the shaft 102 to which the knife carrying arms 101 are fixed.

The knife 15 in its downward movement feeds the doubled sheet between the rollers 16 and 16ª which are continuously driven from the main drive shaft 105, and thence downwardly between the rolls 17, 17ª and 17ᵇ, which likewise are driven from the shaft 105. During such downward movement of the folded sheet, the rolls 17 and 17ᵇ serve to trim the opposite ends of the sheet while the rolls 17ª sever the folded sheet into separate folders A and A', as shown in Fig. 26.

After such trimming and severing operation, the completed folders drop downwardly and are deflected by the inclined plates 128 on the upper end of the member 126 into the vertical grooves 127 and 127ª of said member (Fig. 20). Said grooves serve to hold the folders in upright position in their chutes until they are forced outwardly therein by the followers 129 which are reciprocated by the rocking of the shaft 233 to which the follower is operatively connected, said shaft being rocked by means of the cam 237 (Fig. 5ª) operating through the strap 236, link 235 and arm 234.

Upon each operation of the knife 15, the register 18 is actuated, provided a sheet *a* has been moved into position to be operated upon. If a sheet *a* has not been moved into position, the finger 137 remains in engagement with the stud 140 (Figs. 4 and 16) and thus prevents an actuation of the lever 133 when the knife is swung downwardly. Thus in each folding operation, the finger being moved out of engagement with the stud 140, the register is actuated by the lever 133.

Each operation of the lever 133 also actuates the dividing means 20 by rotating the shaft 153 which is operatively connected with the lever 143 (Fig. 19) of said means. The operation of said lever 143 in turn actuates the pawl 142 and thereby the toothed wheel 141 and disk 147; and when the notched recess 147ª in the disk is brought into position to receive the roller 148 on the arm 144, said arm is actuated by the spring 146 to move the slide 145. The slide is thus moved into the path of movement of the folders A and A' once for each complete revolution of the toothed wheel 141, and since said wheel is moved forwardly the distance of one tooth for each folder that is dropped into the chute, it will be seen that when the number of folders which have been dropped equals the number of teeth on the wheel the notch 147ª on the disk 147 will have been moved into position to receive the roller 148. Thereupon the slide 145 will be moved into position to stop the folder which has dropped during the last movement of the wheel. Thus the number of folders in each set formed by the raised folders will be determined by the number of teeth on the wheel 141. When the folder engages with the slide in its downward movement it becomes distorted so that its lower end protrudes beyond the ends of the preceding folders, and when the follower 129 pushes such distorted folder outwardly in the chute, it is positioned so that its projecting end will engage with the rod 145ª. Thus the upper end of the folder will be supported after it is forced out of the grooves in the member 26, above the preceding folders.

It will be understood that the dividing means is not limited to use in a machine for making vertical filing folders, but is capable of use in other machines which discharge therefrom in rapid succession completed articles of a similar nature.

It will be seen that a plurality of sheets *a* may be simultaneously operated upon by the machine, each of the operating devices being arranged to operate in rapid succession upon the sheets as they travel through the machine. Thus the rate of production of completed folders is very high and at the same time the power consumed and the number of attendants required to successfully operate the machine is reduced to a minimum. Furthermore the accurate division of the folders into sets of a predetermined number saves a great deal of time and labor by obviating the necessity of counting the folders.

It will also be seen that the machine may be readily adjusted to make various sizes of folders; that any desired form of index tab and the notch formed to disclose the same may be readily obtained by the use of the proper cutting blades; that the sheets are positively positioned for each operation thereon; and that any tendency of the sheet to buckle or otherwise get out of order so as to interfere with operation of the machine is effectively prevented.

While I have herein described my invention with considerable particularity, it will be understood that I do not wish to be limited to the construction and arrangement set forth but that various changes therein may be made without departing from the spirit and scope of my invention.

I claim as my invention:

1. A machine of the character described having, in combination, preliminary feeding means for a sheet to be operated upon, means for carrying the sheet longitudinally of the machine, means for trimming the opposite side edges of the sheet and means for scoring the sheet centrally thereof during such longitudinal movement, means for stopping the sheet in its longitudinal movement, means for moving the sheet laterally to position the same, cutting devices operating upon the opposite side edges of the sheet when positioned, means for causing the sheet to travel longitudinally after the cutting operation, means for again moving the sheet laterally of the machine, means for folding the sheet upon itself along its central score, means for trimming the opposite ends of the folded sheet, means for severing the sheet into a plurality of completed articles as it passes from said folding means, and means for receiving the completed articles and maintaining them in upright position.

2. A machine of the character described having, in combination, preliminary feeding means for a sheet to be operated upon, means for carrying the sheet longitudinally of the machine, means for trimming the opposite side edges of the sheet and means for scoring the sheet centrally thereof during such longitudinal movement, means for stopping the sheet in its longitudinal movement, means for moving the sheet laterally to position the same, cutting devices operating upon the opposite side edges of the sheet when positioned, means for causing the sheet to travel longitudinally after the cutting operation, means for again moving the sheet laterally of the machine, means for folding the sheet upon itself along its central score, means for trimming the opposite ends of the folded sheet, means for severing the sheet into a plurality of completed articles as it passes from said folding means, means for receiving the completed articles and maintaining them in upright position, and means for moving the completed articles laterally.

3. A machine of the character described having, in combination, preliminary feeding means for sheets to be operated upon, means for carrying the sheets longitudinally of the machine, means for scoring the sheets centrally thereof during such longitudinal movement, means for stopping the sheets in their longitudinal movement, means for moving the sheets laterally to position the same, cutting devices operating upon the opposite side edges of the sheets when positioned, means for causing the sheets to travel longitudinally after the cutting operation, means for again moving the sheets laterally of the machine, means for folding the sheets along their central scores, means for severing each sheet into a plurality of completed articles as it passes from said folding means, and means for receiving the completed articles and maintaining them in upright position.

4. A machine of the character described having, in combination, means for causing a sheet to travel longitudinally of the machine, plural means for trimming the opposite side edges of the sheet and scoring the sheet centrally thereof in its preliminary movement, means for stopping the sheet in its longitudinal travel, means for moving the sheet laterally to position the same, cutting means for operating upon the sheet when thus positioned, means for again causing the sheet to travel longitudinally after the cutting operation, means for again moving the sheet laterally, means for folding the sheet along a central score, plural means for trimming the opposite ends of the folded sheet and severing the same into a plurality of completed articles, and means for receiving the completed articles in their folded form.

5. A machine of the character described having, in combination, means for causing a sheet to travel longitudinally of the machine, means for stopping the sheet in its longitudinal travel, means for moving the sheet laterally to position the same, cutting means for operating upon the sheet when thus positioned, means for again causing the sheet to travel longitudinally after the cutting operation, means for again moving the sheet laterally of the machine, means for folding the sheet, means for severing the sheet into a plurality of completed articles, and means for receiving the completed articles in their folded form.

6. A machine of the character described having, in combination, means for causing sheets to travel longitudinally of the machine, plural means for trimming the opposite side edges of the sheets and scoring the sheets centrally thereof in their preliminary movement, means for stopping the sheets in their longitudinal travel, means for positioning such sheets, cutting means for operating upon the sheets when thus positioned, means for again causing the sheets to travel longitudinally after the cutting operation, means for again moving the sheets laterally of the machine, means for folding the sheets along a central score, plural means for trimming the opposite ends of the folded sheets and severing the same into a plurality of completed articles, and means for receiving the completed articles in their folded form.

7. A machine of the character described having, in combination, means for causing a sheet to travel longitudinally, means for scoring the sheet centrally thereof in its preliminary movement, means for stopping the sheet in its longitudinal travel, means for moving the sheet laterally after it is stopped, cutting means for operating upon the sheet when thus positioned, means for again causing the sheet to travel longitudinally a fixed distance, means for again moving the sheet laterally to position the same, means for folding the sheet when positioned, means for severing the folded sheet, and means for receiving the separate sections.

8. A machine of the character described having, in combination, means for causing a sheet to travel longitudinally, means for stopping the sheet in its longitudinal travel, means for moving the sheet laterally after it is stopped, cutting means for operating upon the sheet when thus positioned, means for again causing the sheet to travel longitudinally a fixed distance, means for again moving the sheet laterally to position the same, means for folding the sheet when positioned, and means for severing the folded sheet.

9. A machine of the character described having, in combination, means for causing sheets to travel longitudinally, means for scoring the sheets centrally thereof in their preliminary movement, cutting means, means for positioning the sheets relative to such cutting means, means for again causing the sheets to travel longitudinally a fixed distance, means for again moving the sheets laterally to position the same, means for folding the sheets when positioned, and means for severing the folded sheets into separate articles.

10. A machine of the character described having, in combination, means for causing the sheet to travel longitudinally, means for scoring the sheet centrally thereof in its travel, cutting means, means for positioning the scored sheet with reference to said cutting means, means for actuating the cutting means, folding means, means for positioning the sheet with reference to said folding means, means for actuating the folding means, means for severing the folded sheet into separate articles, and means for receiving said articles.

11. A machine of the character described having, in combination, means for causing sheets to travel longitudinally, means for scoring the sheets centrally thereof in their travel, laterally adjustable cutting means, means for positioning the sheets with reference to said cutting means, means for actuating the cutting means, folding means, means for positioning the sheets with reference to said folding means, means for actuating the folding means, and means for severing the folded sheets into separate articles.

12. A machine of the character described having, in combination, means for scoring a sheet centrally thereof, cutting means, means for positioning the sheet relative to said cutting means, means for actuating said cutting means, folding means, means for positioning the sheet relative to said folding means, means for actuating the folding means, means for severing the folded sheet into a plurality of separate articles, and means for receiving said articles.

13. A machine of the character described having, in combination, means for scoring sheets centrally thereof, cutting means comprising a relative fixed member and an oscillatory cutting member, means for positioning the sheets relative to said cutting means, means for actuating said oscillatory cutting member, folding means, means for positioning the sheets relative to said folding means, means for actuating said folding means, means for severing each folded sheet into a plurality of separate articles, and means for receiving the completed articles.

14. A machine of the character described having, in combination, plural means for trimming the opposite side edges of and providing a central score in a sheet, cutting means, means for positioning the sheet relative to said cutting means, means for actuating said cutting means, folding means, means for positioning the sheet relative to said folding means, means for actuating said folding means, plural means for trimming and severing the folded sheet, and means for receiving the severed sections of the sheet.

15. A machine of the character described having, in combination, means for scoring a sheet centrally thereof, means for trimming the opposite side edges of the sheet, means for forming an index tab on one edge of the sheet, means for positioning the sheet relative to said tab-forming means, means for actuating said tab-forming means, means for folding the sheet along its central score, means for positioning the sheet preliminary to the folding operation, means for severing the folded sheet, and means for receiving the severed sections thereof.

16. A machine of the character described having, in combination, means for scoring a sheet centrally thereof, means for positioning the sheet, means for forming an index tab at one side edge thereof, means for again positioning the sheet, means for folding the sheet along a central score, cutting means for trimming the opposite end edges of the sheet, means for severing the sheet into separate sections, and means for receiving the severed sections.

17. A machine of the character described having, in combination, means for scoring a sheet centrally thereof, means for positioning the sheet, means for forming an index tab at one edge thereof, means for again positioning the sheet, means for folding the sheet along its central score, rotary cutting devices for severing the sheet into separate sections, and means for receiving the severed sections.

18. A machine of the character described having, in combination, means for scoring a sheet, cutting means, means for positioning the sheet relative to said cutting means to enable said means to operate upon the opposite side edges of the sheet, means for actuating the cutting means, folding means, means for positioning the sheet relative to said folding means to enable the folding means to fold the sheet along its central score, means for actuating said folding means, and means for severing the folded sheets into a plurality of separate sections.

19. A machine of the character described having, in combination, cutting means, means for positioning the sheet relative to said cutting means to enable said means to operate upon the opposite side edges of the sheet, means for actuating said cutting means, folding means, means for positioning the sheet relative to said folding means to enable the folding means to fold the sheet centrally thereof, and means for actuating said folding means.

20. A machine of the character described having, in combination, means for scoring sheets, means for trimming the opposite side edges of the sheets, cutting means, means for positioning the sheets relative to said cutting means to enable said means to operate upon the opposite side edges of the sheets, means for actuating said cutting means, folding means, means for positioning the sheets relative to said folding means to enable the folding means to fold the sheets along a central score, means for actuating said folding means, and means for receiving the folded sheets.

21. A machine of the character described having, in combination, means for feeding a sheet, means for trimming the opposite side edges of the sheet, means for forming an index tab on one side edge of the sheet, folding means, means for positioning the sheet relative to said folding means to enable such means to engage with the sheet centrally thereof to fold it upon itself, means for actuating the folding means, means for trimming the opposite end edges of the folded sheet, and means for receiving the folded sheet.

22. A machine of the character described having, in combination, means for scoring a sheet centrally thereof, means for forming a plurality of index tabs on one edge of the sheet, a pair of folding rolls, a folding knife, means for moving the sheet to position it so as to be engaged by said knife along its central score and to be inserted between said rolls, means for actuating said knife, means for severing the folded sheet as it is discharged from said folding rolls, and means for receiving the separate sections of the sheet.

23. A machine of the character described having, in combination, means for scoring a sheet centrally thereof, means for forming an index tab on one edge thereof, folding means, a stationary bar, a pair of members arranged to be reciprocated to move the sheet laterally into engagement with said bar, means for actuating the folding means to fold the sheet upon itself along its central score, and means for receiving the folded sheet and maintaining it in upright position.

24. A machine of the character described having, in combination, means for scoring sheets centrally thereof, means for forming an index tab on one edge of each sheet parallel to such central score, means for folding the sheets along a central score, a member having an upright groove for receiving said folded sheets, and means for moving the folded sheet out of said groove.

25. A machine of the character described having, in combination, means for scoring a sheet centrally thereof, a cutting device for forming an index tab on one edge of the sheet including a relatively fixed but adjustable cutting member and an oscillatory cutting member mounted on the fixed cutting member, and means for folding the sheet along its central score.

26. A machine of the character described having, in combination, means for scoring a sheet centrally thereof, cutting devices for operating simultaneously upon opposite edges of the sheet parallel to the score formed therein including a fixed cutting member and an oscillatory cutting member, means for folding the sheet along its central score, and means for receiving the folded sheet and maintaining it in upright position.

27. A machine of the character described having, in combination, means for scoring a sheet centrally thereof, means for forming an index tab on one edge of the sheet parallel to the score formed therein, means for forming a tab-disclosing notch at the opposite edge of the sheet, and means for folding the sheet along its central score.

28. A machine of the character described having, in combination, means for scoring a sheet centrally thereof, means for forming an index tab on one edge of the sheet including a fixed member having a cutting blade mounted thereon and a movable member having a cutting blade adjustable thereon, and means for folding the sheet along its central score.

29. A machine of the character described having, in combination, means for moving a sheet longitudinally, means for scoring the sheet in its preliminary longitudinal movement, a cutting device extending longitudinally of the machine and having a stop thereon, means for moving the sheet laterally into engagement with said stop, means for actuating the cutting device, folding means, and means for actuating the folding means to fold the sheet along its central score.

30. A machine of the character described having, in combination, means for moving a sheet longitudinally, means for scoring the sheet centrally thereof, a cutting device, means for positioning the sheet relative to said cutting device, including a stop thereon, means for adjusting the position of said cutting device laterally of the machine, means for actuating the cutting device, folding means, means for positioning the sheet relative to said folding means, and means for actuating said folding means.

31. A machine of the character described having, in combination, means for moving a sheet longitudinally, means for scoring the sheet, means for stopping the sheet in its longitudinal travel, means for moving the sheet laterally, a cutting device, an adjustable stop for limiting the lateral movement of the sheet, means for actuating the cutting device, folding means, means for positioning the sheet relative to the folding means, and means for actuating the folding means.

32. A machine of the character described having, in combination means for moving a sheet longitudinally, means for scoring the sheet centrally thereof, a stop movable into and out of the path of movement of the sheet, a cutting device, means for moving the sheet laterally into position relative to said cutting device, means for actuating the cutting device, means for moving the said stop to permit the sheet to again travel longitudinally, folding means, means for positioning the sheet relative to said folding means, and means for actuating the folding means.

33. A machine of the character described having, in combination, an endless conveyer, means for feeding a sheet onto said endless conveyer, means for scoring the sheet centrally thereof, means for stopping the longitudinal movement of the sheet on said conveyer, means for moving the sheet laterally of said conveyer, cutting devices arranged to operate upon opposite edges of the sheet parallel to the score formed therein, and means for folding the sheet along its central score.

34. A machine of the character described having, in combination, an endless conveyer, means for feeding a sheet onto said conveyer, means for scoring the sheet centrally thereof, a stop movable into and out of the path of movement of the sheet upon said conveyer, means for actuating said stop to stop the sheet in its longitudinal movement, cutting devices, means for positioning the sheet laterally of the conveyer relative to said cutting devices, means for actuating the cutting devices, means for raising said stop to permit the sheet to again travel longitudinally, and means for folding the sheet along its central score.

35. A machine of the character described having, in combination, an endless conveyer, means for feeding a sheet onto said conveyer, means for scoring the sheet centrally thereof, cutting devices, means for positioning the sheet relative to said cutting devices, means for actuating said cutting devices, folding means, means for positioning the sheet relative to said folding means, means for actuating the folding means, and means for pressing the sheet onto said conveyer during its movement.

36. A machine of the character described having, in combination, feeding means for a sheet, an endless conveyer for moving the sheet longitudinally, a stop with which the sheet is arranged to engage in its longitudinal travel, means for pressing the sheet upon the conveyer and preventing a rebound thereof when it strikes the stop, means for moving the sheet laterally relative to the conveyer, means for forming an index tab on one edge of the sheet, means for causing the sheet to again travel longitudinally, and means for folding the sheet along its central score.

37. A machine of the character described having, in combination, means for causing a sheet to travel longitudinally, means for scoring the sheet centrally thereof, cutting devices, means for positioning the sheet relative to said cutting devices including a stop and an oscillatory member having yieldingly mounted rollers thereon arranged to engage with the sheet, means for actuating the cutting devices, means for moving the sheet longitudinally, and means for folding the sheet along its central score.

38. A machine of the character described having, in combination, means for moving a sheet longitudinally, a member movable into and out of the path of movement of the sheet, cutting devices, a continuously rotating roll, a roller movable into and out of engagement with said sheet upon said roll, means for actuating the said member to stop the sheet in its longitudinal movement, means for actuating said roller to move the sheet laterally, means for actuating the cutting devices, means for actuating said stopping member to permit the sheet to travel longitudinally, and means for folding the sheet centrally thereof.

39. A machine of the character described having, in combination, an endless conveyer, a plate upon which a sheet is arranged to be moved longitudinally by said conveyer, a stop movable into and out of the path of movement of the sheet, said plate having a recess therein arranged to receive the lower edge of the stop, means for moving the sheet laterally, means for forming an index tab on one edge of the sheet, means for causing the sheet to again travel longitudinally, folding means, means for positioning the sheet relative to said folding means, and means for actuating the folding means.

40. A machine of the character described having, in combination, a frame, means for feeding a sheet, means for forming an index tab on one edge thereof and a tab-disclosing notch on the other edge thereof, said means comprising a fixed member and an oscillatory member mounted thereon, and means for folding the sheet upon itself.

41. A machine of the character described having, in combination, means for forming an index tab on a sheet comprising a fixed cutting member, an oscillatory cutting member adjustably mounted on the fixed member, and means for actuating the oscillatory member.

42. A machine of the character described having, in combination, means for forming index tabs on a sheet comprising a fixed member having a cutting blade, an oscillatory member on the fixed member and having a cutting blade, adjustable thereon, and means for actuating the oscillatory member.

43. A machine for making vertical filing folders having, in combination, means for moving a sheet comprising a stationarily mounted roll, a swingable arm having a bearing stud, and a roller loosely mounted on said stud.

44. A machine for making vertical filing folders having, in combination, tab-forming means, means for positioning a sheet relative to said tab-forming means comprising a stop swingable into and out of the path of movement of a sheet, folding means, and means for moving the sheet toward said folding means comprising a stationarily mounted roll and a movably mounted roller swingable toward and from said roll, said stop and said roller being operatively associated with each other for movement in opposite directions.

45. A machine for making vertical filing folders having, in combination, means for feeding a sheet, rotary means for trimming the opposite edges of the sheet, rotary means for scoring the sheet centrally thereof, means for forming an index tab on one edge of the sheet, and means for folding the sheet along a central score.

46. A machine for making vertical filing folders having, in combination, means for feeding a sheet, rotary means for trimming the opposite side edges of the sheet, means for scoring the sheet centrally thereof, means for forming an index tab on one edge of the sheet, means for folding the sheet along a central score, and rotary means for trimming the opposite end edges of the sheet.

47. A machine for making vertical filing folders having, in combination, means for feeding a sheet, rotary means for trimming the opposite side edges of the sheet, rotary means for scoring the sheet centrally thereof, means for forming a plurality of index tabs on one edge of the sheet, means for folding the sheet along a central score, rotary means for trimming the opposite end edges of the folded sheet, and rotary means for severing the sheet into a plurality of completed folders.

48. A machine of the character described having, in combination, means for causing a sheet to travel longitudinally, means for scoring the sheet centrally thereof, means for trimming the opposite side edges of the sheet, means for stopping the sheet in its longitudinal travel, means for moving the sheet laterally, means for forming an index tab on one edge of the sheet, means for holding the sheet against movement during the tab-forming operation, means for causing the sheet to again travel longitudinally, and means for folding the sheet along a central score.

49. A machine of the character described having, in combination, means for causing a sheet to travel, means for scoring the sheet centrally thereof, cutting devices, means for positioning the sheet relative to said cutting devices, means for clamping the sheet in such position during the operation of the cutting devices, means for moving the sheet longitudinally from said cutting devices, and means for folding the sheet along a central score.

50. A machine of the character described having, in combination, a plate, means for positioning a sheet above said plate, a cutting device for operating upon one edge of the sheet, and means for pressing the sheet upon said plate during the cutting operation comprising an oscillatory arm having a gripping finger on its free end.

In testimony whereof, I have hereunto set my hand.

CARL F. ANDERSON.